(12) United States Patent
Makisaka et al.

(10) Patent No.: US 7,111,310 B2
(45) Date of Patent: Sep. 19, 2006

(54) REPRODUCING/RECORDING APPARATUS

(75) Inventors: Yukinari Makisaka, Tokorozawa (JP);
Kenjirou Ooizumi, Tokorozawa (JP);
Youichi Konno, Tokorozawa (JP);
Kenji Kikuchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 399 days.

(21) Appl. No.: 10/775,330

(22) Filed: Feb. 11, 2004

(65) Prior Publication Data
US 2004/0218478 A1 Nov. 4, 2004

(30) Foreign Application Priority Data
Feb. 13, 2003 (JP) .............................. 2003-035719

(51) Int. Cl.
*G11B 17/04* (2006.01)
(52) U.S. Cl. .................................................... 720/619
(58) Field of Classification Search ............... 369/30.6;
720/600, 601, 607, 613, 621, 622, 632, 635
See application file for complete search history.

(56) References Cited

U.S. PATENT DOCUMENTS

| | | | |
|---|---|---|---|
| 4,546,396 A | 10/1985 | Schatteman | 360/96.5 |
| 4,627,042 A | 12/1986 | Hara | 369/77.1 |
| 4,979,160 A | 12/1990 | Araki | 369/75.2 |
| 5,054,016 A | 10/1991 | d'Alayer et al. | 369/270 |
| 5,798,997 A * | 8/1998 | Ware et al. | 720/660 |
| 6,052,342 A * | 4/2000 | Yoshimura | 369/30.85 |
| 6,650,609 B1* | 11/2003 | Omori et al. | 720/649 |
| 7,028,315 B1* | 4/2006 | Kuo et al. | 720/619 |
| 2001/0021155 A1* | 9/2001 | Saito | 369/75.1 |
| 2002/0044520 A1 | 4/2002 | Kabasawa | 369/77.2 |
| 2004/0105354 A1* | 6/2004 | Kimura et al. | 369/30.36 |

OTHER PUBLICATIONS

European Search Report dated Dec. 9, 2004.

* cited by examiner

*Primary Examiner*—Allen Cao
(74) *Attorney, Agent, or Firm*—Armstrong, Kratz, Quintos, Hanson & Brooks, LLP

(57) ABSTRACT

There is provided a reproducing/recording apparatus that can reduce a load required for pushing in a case to activate a motor of a loading mechanism. The recording/reproducing apparatus includes a gear mechanism coupled with the motor, and a rack (43) coupled with the gear mechanism and provided along an advancement and retraction direction of a base plate (3), i.e., the case. Between the rack (43) and the base plate (3), grooves (32A) are formed for allowing a relative movement of the rack (43) and the base plate (3) along the advancement and retraction direction. Between the base plate (3) and the gear mechanism, a start cam mechanism is formed for starting rotation of the motor when the base plate (3) advances to a predetermined position. With such configuration, the base plate (3) can advance within the length of the grooves (32A) without much load when a user pushes in the base plate (3), therefore the disk D can be easily loaded.

11 Claims, 21 Drawing Sheets

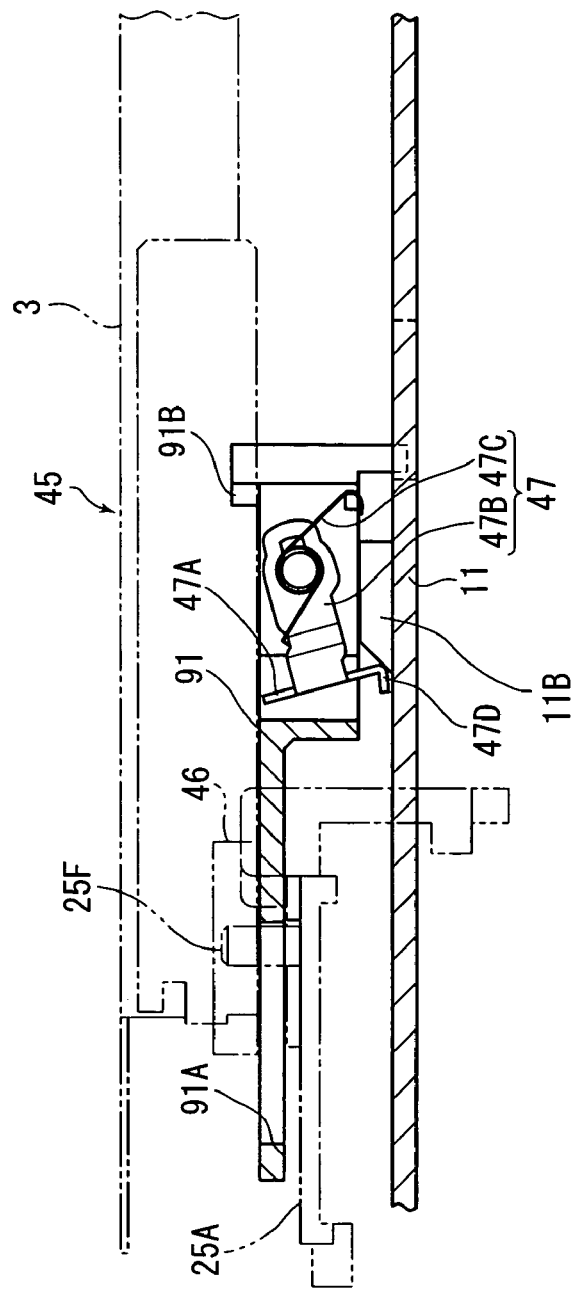
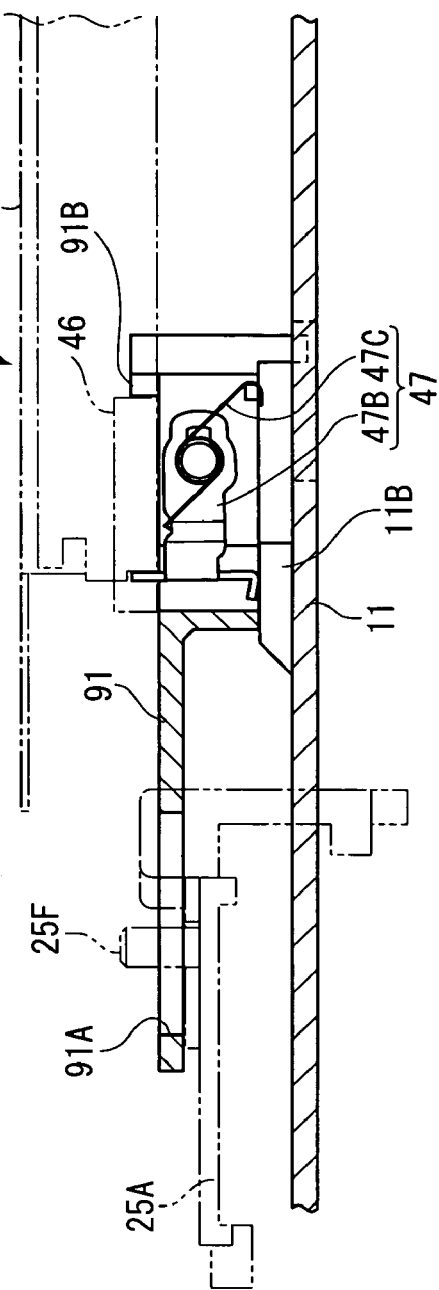
FIG. 12A
FIG. 12B

REPRODUCING/RECORDING APPARATUS

BACKGROUND OF THE INVENTION

1. Field of the Invention

The present invention relates to a reproducing/recording apparatus having a disk gate for inserting and ejecting a disk.

2. Description of Related Art

A reproducing/recording apparatus is used for reproducing data from or recording data on a disk.

As an example of such reproducing/recording apparatus, there is a tray type one that includes an apparatus body having a disk gate for inserting and ejecting a disk, a tray provided inside the apparatus body for accommodating the disk, a recording/reproducing mechanism for recording on and reproducing from the disk accommodated in the tray, and a loading mechanism for advancing and retracting the tray between a position where the disk faces the recording/reproducing mechanism and a position near the disk gate.

The loading mechanism includes a motor, a plurality of gears driven by the motor, and a rack coupled with the gears and provided on the tray. When the tray advances to a predetermined position, a sensor switch is activated to start or stop rotation of the motor.

This switch is adapted to shit operations by manually pushing in the tray that has been drawn out from the disk gate.

In the above example of the prior art, a motor switch is turned on by pushing in the tray. However, since the tray is coupled with the motor switch through the plurality of gears, there is a disadvantage that the tray push-in operation comes with a load to idle the gears.

As another example of the reproducing/recording apparatus, there is a slot-in type one in which an arm for holding the outer circumferential edge of the disk is provided on a base plate. The distance that the base plate of the slot-in type reproducing/recording apparatus advances and retracts is shorter than the distance that the tray of the tray type does. Accordingly, in the slot-in type, comparing with the tray type, the plurality of gears of the loading mechanism should have higher gear ratio and thus a large load is imposed on base plate push-in operation.

SUMMARY OF THE INVENTION

A main object of the present invention is to provide a reproducing/recording apparatus that can reduce a load required for pushing in a case to activate a motor of a loading mechanism.

A reproducing/recording apparatus according to the present invention includes: an apparatus body having a disk gate for inserting and ejecting a disk; a case provided inside the apparatus body for accommodating the disk; a recording/reproducing mechanism for recording on and reproducing from the disk accommodated in the tray; and a loading mechanism for advancing and retracting the case between a position where the disk faces the recording/reproducing mechanism and a position near the disk gate, the loading mechanism including a motor, a gear mechanism coupled with the motor, and a rack coupled with the gear mechanism and provided along an advancement and retraction direction of the case, in which a groove is formed on at least one of the rack and the case for allowing a relative movement of the rack and the case along the advancement and retraction direction, and in which a start mechanism is formed between the case and the gear mechanism for starting rotation of the motor when the case advances to a predetermined position.

BRIEF DESCRIPTION OF THE DRAWINGS

FIGS. 12A and 12B are sectional views each showing a primary portion of the start cam mechanism;

DETAILED DESCRIPTION OF PREFERRED EMBODIMENT(S)

An embodiment of the present invention will be described below with reference to attached drawings.

Figure 1:
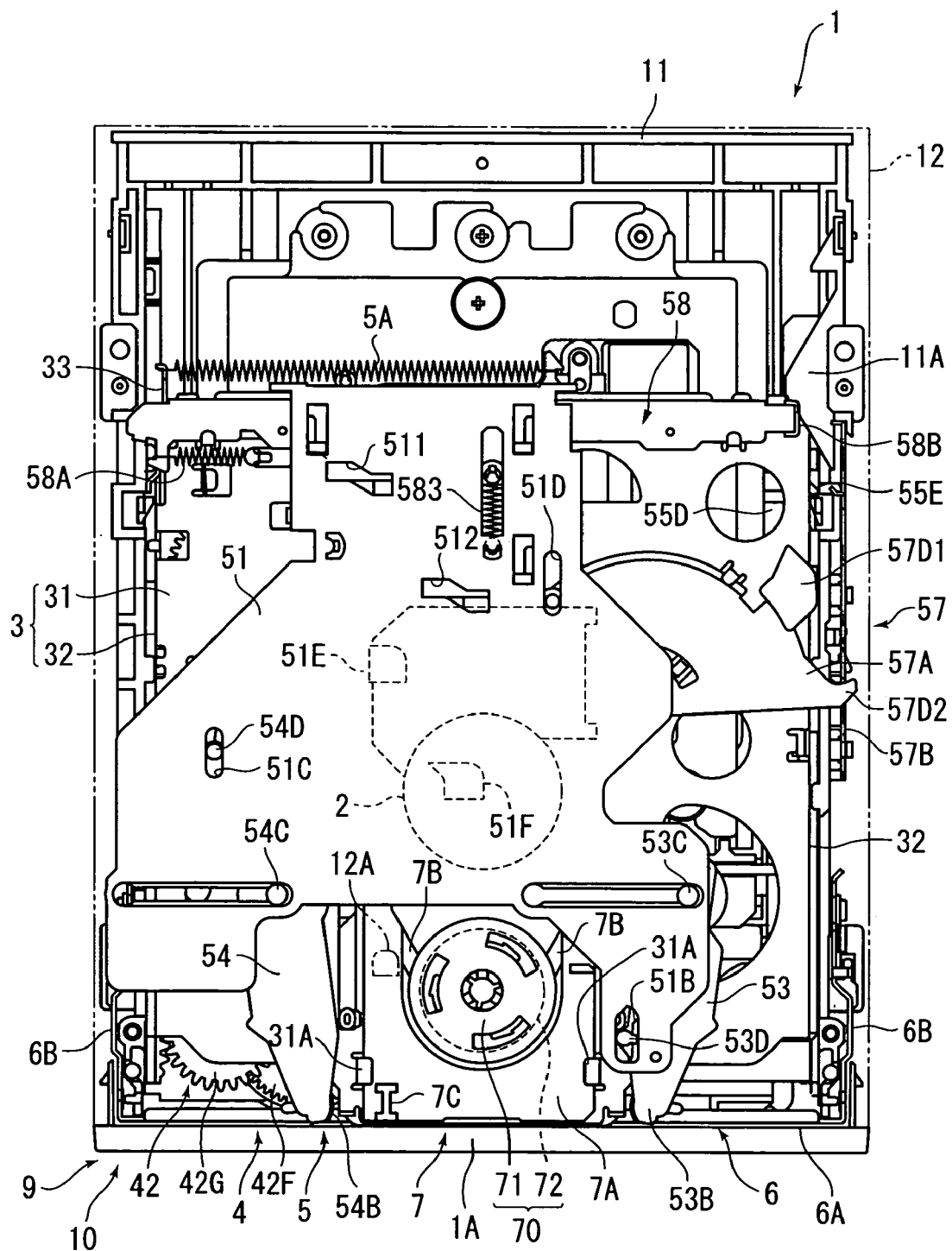
FIG. 1 is a plan view of whole inner structure according to an embodiment of the present invention.

FIG. 1 is a plan view of whole inner structure according to the present embodiment.

In FIG. 1, a slot-in type reproducing/recording apparatus includes an apparatus body 1 having a slot 1A, as a disk gate, provided on a front surface for inserting and ejecting a disk, a recording/reproducing mechanism 2 and a base plate 3 each provided inside the apparatus body 1, a loading mechanism 4 for advancing and retracting the base plate 3, a hold assembly 5 provided on the base plate 3 for holding the disk, and a shutter 6 turnably provided on the apparatus body 1 for opening and closing the slot 1A. In this embodiment, the base plate 3 and the hold assembly 5 constitute a case for accommodating the disk.

The apparatus body 1 includes a housing 11 made of synthetic resin, a bottom plate (not shown) attached to a bottom of the housing 11, a substantially box-shaped upper lid 12 that is held by an edge of the bottom plate and covers the housing 11, and an electric circuit board (not shown) attached to an under surface of the housing 11.

The bottom plate and the upper lid 12 are integrally formed of sheet metal.

Figure 2:
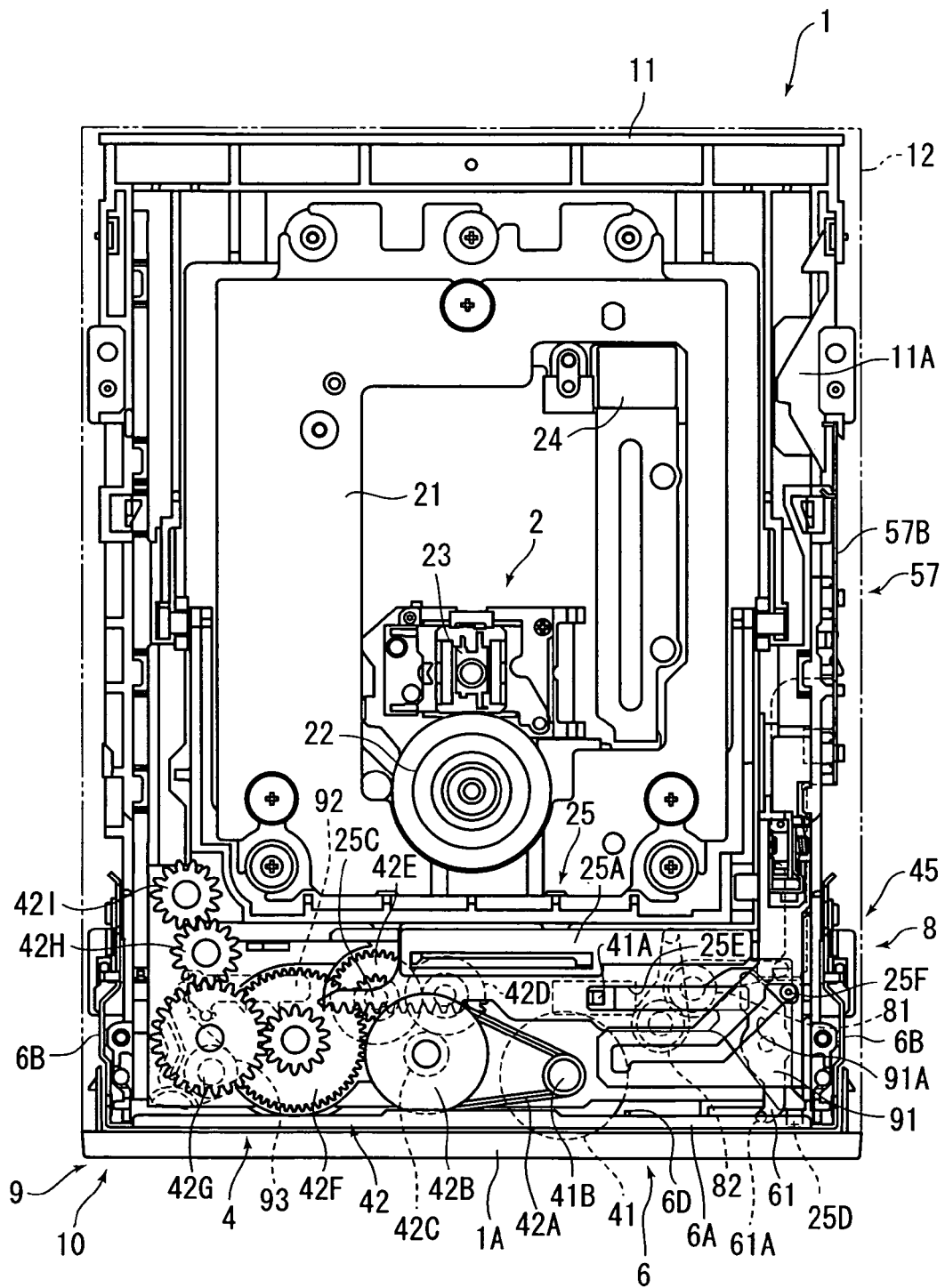
FIG. 2 is a plan view of the inner structure shown in FIG. 1, where a base plate and a hold assembly are removed.

FIG. 2 is a plan view of the inner structure shown in FIG. 1 of the present embodiment, where the base plate 3 and the hold assembly 5 are removed.

In FIG. 2, the recording/reproducing mechanism 2 is an apparatus for recording data on and/or reproducing data from the disk while irradiating a laser beam onto the disk, the recording/reproducing mechanism 2 including a base 21, a rotary table 22 attached to the base 21 for the disk to be placed on, a recording/reproduction mechanism body 23 for irradiating the laser beam onto the disk placed on the rotary table 22 and reading a light reflected by the disk, and a drive mechanism 24 for advancing and retracting the recording/reproducing mechanism body 23 along a radial direction of the disk. The rotary table 22, the recording/reproducing mechanism body 23 and the drive mechanism 24 are configured in the same manner as in a tray type reproducing/recording apparatus.

In the base 21, an end thereof (the upper side in FIG. 2) is turnably supported by the housing 11 while the other end (the lower side in FIG. 2) is swingable toward and away form the disk accommodated in the hold assembly 5. A swing mechanism 25 for swinging the base 21 is provided at the other end of the base 21.

The drive mechanism 24 includes a motor (not shown) for advancing and retracting the recording/reproducing mechanism body 23 along a guide rod (not shown).

In FIG. 1, the base plate 3 includes a flat section 31 and folded sections 32 which are formed by folding both side edges of the flat section 31 (see FIG. 3), the flat section 31 and the folded sections 32 being integrally formed of sheet metal.

On the flat section 31 of the base plate 3, there are formed a clamper 70 for holding the disk and a clamper hold mechanism 7 for moving the clamper 70 toward the disk when the base plate 3 advances to the recording/reproducing mechanism 2 and for moving the clamper 70 away from the disk when the base plate 3 retracts toward the slot 1A.

The clamper 70 includes a circular plate 71 located on an upper side of the flat section 31, a circular holding portion (not shown) located to face the circular plate 71 sandwiching the flat section 31 therebetween and held in a hole of the disk, and a cylinder 72 for coupling the circular plate 71 and the circular holding portion. The circular holding portion includes a steel plate (not shown) that sticks to a magnet (not shown) of the rotary table 22.

The clamper hold mechanism 7 includes a plate-shaped holder 7A that can advance and retract, with guide by a guide 31A of the flat section 31, in an advancement and retraction direction of the base plate 3, the holder 7A being provided with a substantially U-shaped aperture at an end facing the cylinder 72 of the clamper 70 and also provided with cam portions 7B at ends of the aperture for moving the circular plate 71 upward.

On an upper surface of the holder 7A, there is formed an engagement projection 7C that is engagable with an engagement projection 12A formed on a ceiling of the upper lid 12.

In the clamper hold mechanism 7 with such configuration, when the holder 7A, which lifts the circular plate 71, advances (moves to the upper side in FIG. 1) together with the base plate 3 until the engagement projection 7C contacts the engagement projection 12A of the upper lid 12, the base plate 3 continues to advance whereas the holder 7A stops to be unclamped from the clamper 70. Then the clamper 70 sticks to the rotary table 22 with magnetic force generated by the magnet of the rotary table 22 and clamps the disk.

In the clamper hold mechanism 7, when the base plate 3 retracts (moves to the lower side in FIG. 1), the clamper 70 moves toward the stopped holder 7A so that the cam portions 7B lift the circular plate 71. Then the clamper 70 moves away from the disk and the clamp is released. With the clamp of the clamper 70 being released, the disk can be accommodated in the hold assembly 5.

Figure 3:
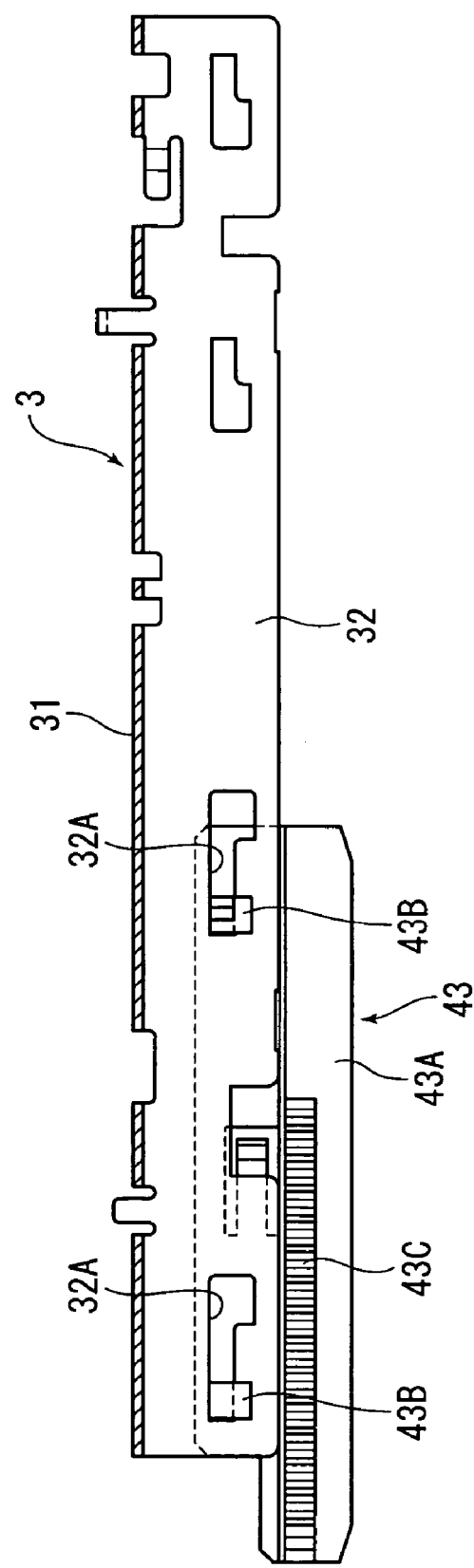
FIG. 3 is a longitudinal section showing the base plate.

In FIG. 2, the loading mechanism 4 advances and retracts the base plate 3 between a position where the disk faces the recording/reproducing mechanism 2 (advancement position) and a position near the slot (retraction position), the loading mechanism 4 including a motor 41 attached to the housing 11 and adapted to operate when the base plate 3 reaches a predetermined advancement starting position and end its operation when the base plate 3 reaches an advancement ending position, a gear mechanism 42 coupled with the motor 41, and a rack 43 coupled with the gear mechanism 42 and provided on the folded section 32 of the base plate 3 along the advancement and retraction direction of the base plate (see FIG. 3). The motor 41 includes a switch lever 41A for executing rotation operation when positioned at the center in FIG. 2 and stopping the rotation operation when located at the left and right sides.

FIG. 3 shows a longitudinal section of the base plate 3.

In FIG. 3, the folded section 32 of the base plate 3 has two grooves 32A formed in line for allowing a relative movement of the rack 43 and the base plate 3 along the advancement and retraction direction.

The rack 43 includes an attachment portion 43A extended toward the advancement and retraction direction, engagement portions 43B formed on the attachment portion 43A so as to engage with the grooves 32A, and a rack body 43C formed under the attachment portion 43A, all of which being integrally molded of synthetic resin.

Referring back to FIG. 2, the gear mechanism 42 includes a pulley 42B coupled with a rotary shaft 41B of the motor 41 through a belt 42A, a first gear 42C disposed to be coaxial with the pulley 42B, a second gear 42D that meshes with the first gear 42C, a third gear 42E that meshes with the second gear 42D, a forth gear 42F that meshes with the third gear 42E, a fifth gear 42G that meshes with the forth gear 42F, a sixth gear 42H that meshes with the fifth gear 42G, and a seventh gear 42I that meshes with the sixth gear 42H and can mesh with the rack 43.

The motor 41 is connected to a controller (not shown) that controls, when the disk is ejected, an initial position of the base plate 3 so as to allow predetermined play in the advancement direction of the base plate 3 (see FIG. 3). Therefore, at the time of the disk insertion, the base plate 3 can advance to a predetermined position without any interference.

Figure 4:
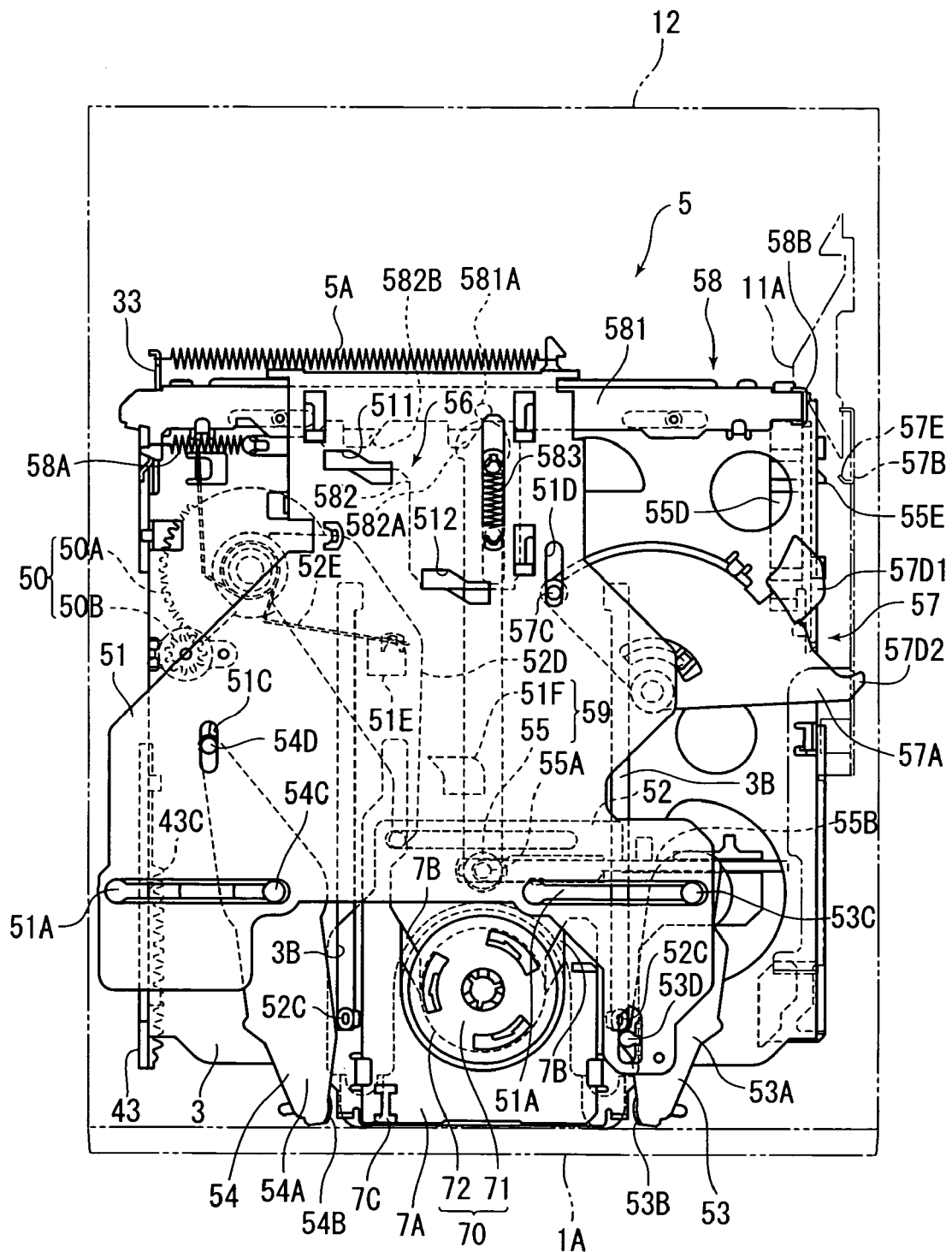
FIG. 4 is a plan view showing the hold assembly.
Figure 5A:
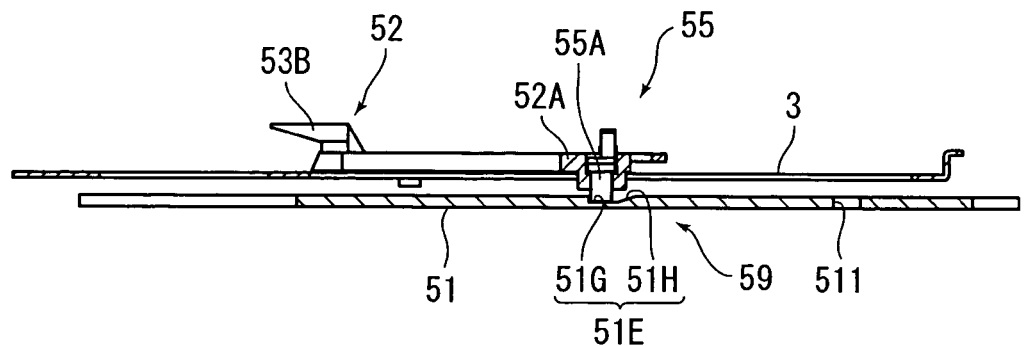
FIG. 5A is a sectional view of a stop mechanism.
Figure 5B:
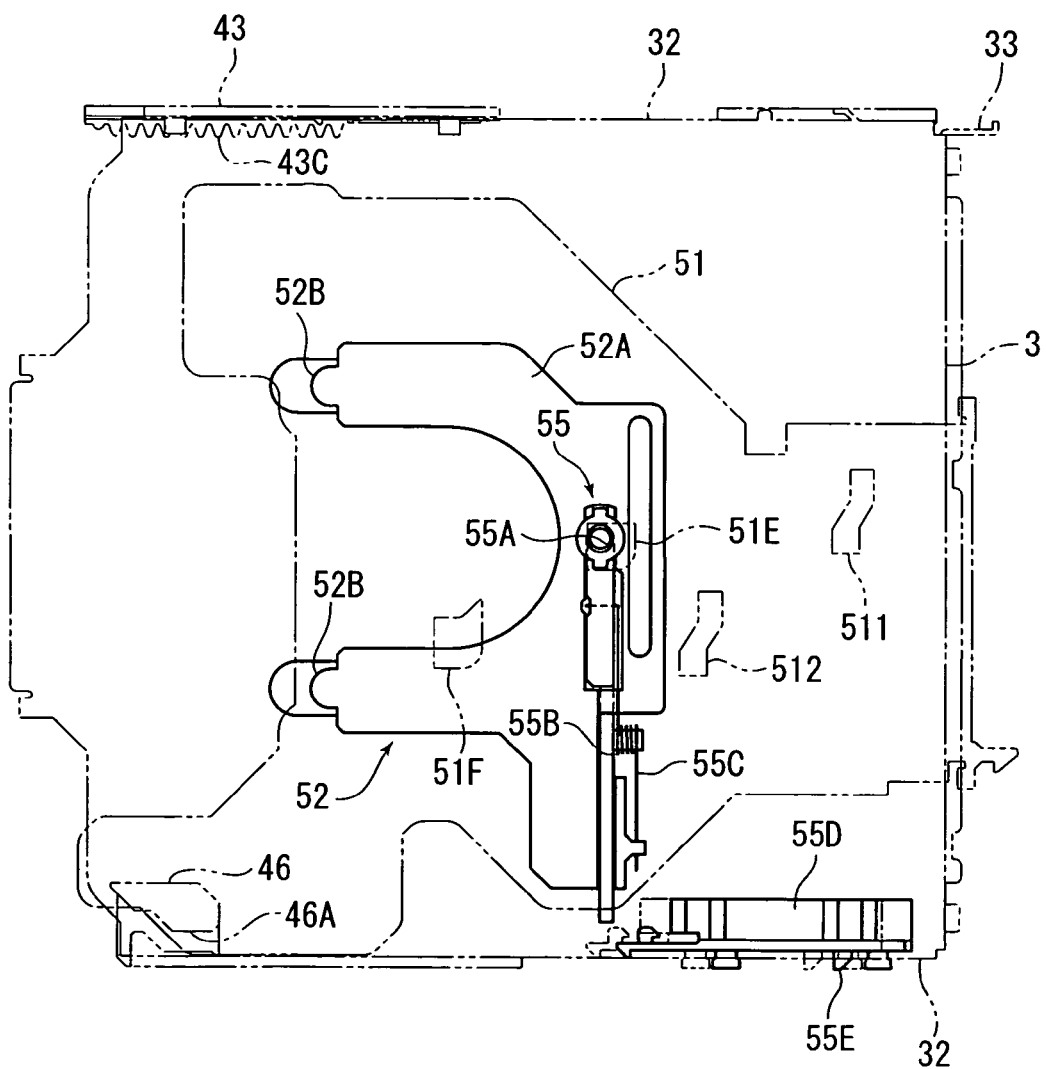
FIG. 5B is a plan view of an engagement pin and an eject arm.
Figure 6:
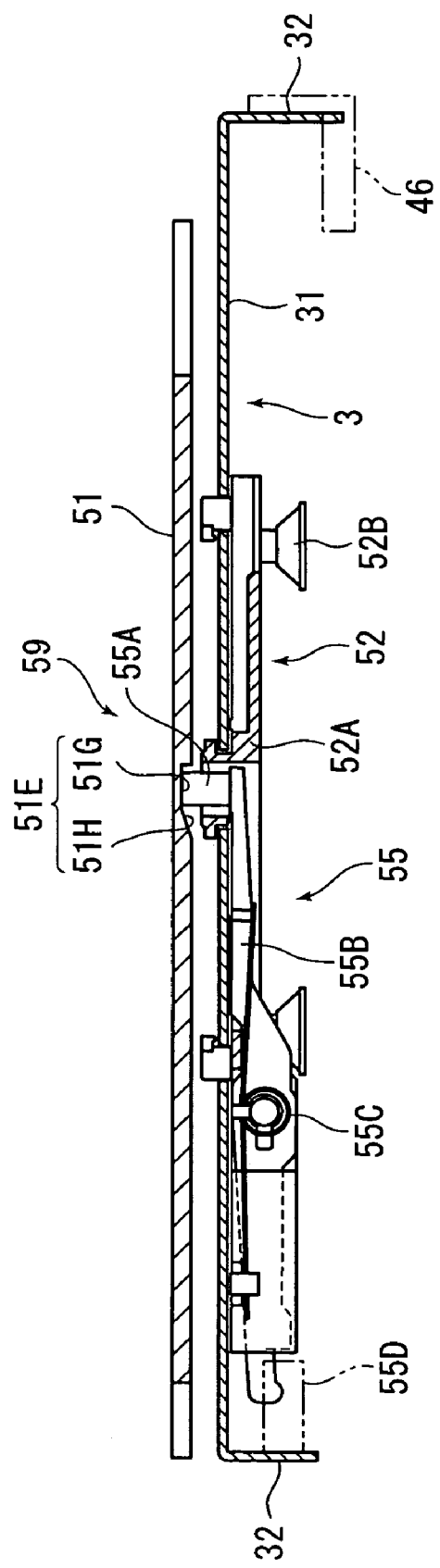
FIG. 6 is a sectional view of the stop mechanism shown in FIG. 5A, which is seen from a different direction.

FIGS. 4 to 6 are illustrations each showing detailed structure of the hold assembly 5.

FIG. 4 is a plan view showing the hold assembly 5.

In FIG. 4, the hold assembly 5 includes a selector plate 51 provided on the base plate 3 to be movable in a level and in a direction orthogonal to the advancement and retraction direction of the base plate 3, an eject arm 52 for pressing an outer circumferential edge of the disk to eject the disk toward the slot 1A, two main arms 53 and 54 that are turnably attached to the base plate 3 and respectively press the outer circumferential edge of the disk, an engagement pin 55 provided on the eject arm 52, and a damper mechanism 50 for reducing push-out force of the disk pushed out by the eject arm 52.

The eject arm 52, as shown in FIGS. 4, 5A and 5B, includes a plate-shaped arm body 52A that is substantially U-shaped in plan view, two abutment portions 52B respectively provided on aperture ends of the arm body 52A and capable of abutting on the outer circumference of the disk, and engagement portions 52C formed on an upper surface of the arm body 52A so as to engage with elongated grooves 3B of the base plate 3. The arm body 52A, the abutment portions 52B and the engagement portions 52C are integrally formed of synthetic resin.

The eject arm 52 is coupled with an end of an arm member 52D, and the other end of the arm member 52D is turnably supported by the base plate 3. Between the arm member 52D and the base plate 3, there is a spring 52E that turns the arm member 52D in clockwise direction in FIG. 4 and constantly biases the eject arm 52 toward the slot 1A.

The damper mechanism 50 includes a large gear 50A provided on the other end of the arm member 52D and a small gear 50B rotatably provided on the base plate 3 to mesh with the large gear 50A. Since the small gear 50B functions as a damper, damping force of the small gear 50B reduces pressing force when biasing force of the spring 52E pushes out the eject arm 52.

The main arms 53 and 54 are respectively adapted to press the outer circumferential edge of the disk at different points with predetermined biasing force.

The main arm 53, shown in the right side in FIG. 1, includes a flat-plate shaped arm body 53A and an abutment portion 53B that is provided at a front end of the arm body 53A and capable of abutting on the outer circumference of the disk. A rear end of the arm body 53A is turnably supported around a turn pin 53C attached to the flat section 31.

The main arm 54, shown in the left side in FIG. 4, includes a flat-plate shaped arm body 54A and an abutment portion 54B that is provided at a front end of the arm body 54A and capable of abutting on the outer circumference of the disk.

A center part of the arm body 54A is turnably supported around a turn pin 54C attached to the flat section 31.

Two engagement elongated-holes 51A are formed in line on the selector plate 51 along the direction orthogonal to the advancement and retraction direction of the base plate 3. The engagement elongated-holes 51A respectively engage with tip ends of the turn pins 53C and 54C.

An engagement elongated-hole 51B is formed near a front end of the main arm 53 of the selector plate 51 along the advancement and retraction direction of the base plate 3. The engagement elongated-hole 51B engage with a tip end of an engagement pin 53D formed at the front end of the main arm 53.

An engagement elongated-hole 51C is formed near a rear end of the main arm 54 of the selector plate 51 along the advancement and retraction direction of the base plate 3. The engagement elongated-hole 51C engages with a tip end of an engagement pin 54D formed at the rear end of the main arm 54.

Accordingly, when the main arms 53 and 54 open, the engagement pins 53D and 54D respectively engage with the engagement elongated-holes 51B and 51C so that the selector plate 51 moves toward one direction (the right direction in FIG. 4) orthogonal to the advancement and retraction direction of the base plate 3. When the main arms 53 and 54 close, the selector plate 51 is biased toward the other direction (the left direction in FIG. 4) by a coil spring 5A. Therefore, the selector plate 51 moves toward the other direction, so that the main arms 53 and 54 close.

As a rear end of the selector plate 51 is coupled with a spring-holding projection 33 formed at a rear left corner of the base plate 3 through the coil spring 5A, the selector plate 51 is biased toward the left direction in FIG. 4 with the biasing force of the coil spring 5A. Accordingly, the main arms 53 and 54 are constantly biased toward a closing direction.

The engagement pin 55, as shown in FIGS. 5A, 5B and 6, includes a substantially columnar pin body 55A, a rod 55B fixed to the pin body 55A at an end and turnably supported by the arm body 52A of the eject arm 52 at a center part, and a spring 55C disposed between the rod 55B and the arm body 52A for biasing the pin body 55A toward the selector plate 51.

The other end of the rod 55B can abut on a cam member 55D provided on the folded section 32 of the base plate 3 to be advancable and retractable along a movement direction of the base plate 3.

The cam member 55D includes a projection 55E projected outward from the folded section 32, the projection 55E being capable of abutting on a projection (not shown) formed on the housing 11.

Referring back to FIG. 4, the hold assembly 5 includes an arm lock mechanism 56, an arm unlock mechanism 57, and base-plate advancement unlock mechanism 58, and a stop mechanism 59.

The arm lock mechanism 56 locks the eject arm 52 and the main arms 53 and 54 when these arms 52 to 54 hold the disk, the arm lock mechanism 56 including two engagement holes 511 and 512 which are formed on the selector plate 51 at different points and the engagement pin 55 of which the pin body 55A engages with the engagement holes 511 and 512. When the pin body 55A is disengaged from the engagement holes 511 and 512, the eject arm 52 moves to a disk-eject direction with the biasing force of the spring 52E and the main arms 53 and 54 turn so that the front ends thereof move toward each other with biasing force of the coil spring 5A. When the base plate 3 retracts toward the slot 1A, the projection 55E abuts on the projection of the housing 11 to restrict a movement of the cam member 55D. However, since the engagement pin 55 moves together with the base plate 3, the other end of the rod 55B of the engagement pin 55 abuts on the cam member 55D so that the pin body 55A is disengaged from the engagement holes 511 and 512.

The engagement hole 511 is located at a position for holding a large disk while the engagement hole 512 is located at a position for holding a small disk.

The arm unlock mechanism 57 releases the lock of the arm lock mechanism 56 to unlock the arms 52 to 54 which hold the disk, the arm unlock mechanism 57 including a turn plate 57A that is turnably attached to the base plate 3 and a slider 57B that engages with an end of the turn plate 57A.

The turn plate 57A has an engagement projection 57C near the outer circumferential edge thereof, the engagement projection 57C being engagable with an engagement groove 51D formed on the selector plate 51 along the advancement and retraction direction of the base plate 3. The turn plate 57A also has engagement pieces 57D1 and 57D2, one of which can abut on an abutment portion 57E formed on the slider 57B. When the turn plate 57A turns in clockwise direction in the drawing, the selector plate 51 moves to the right side to release the main arms 53 and 54.

The slide 57B is attached to a side wall of the hosing 11 to be advancable and retractable along the advancement and retraction direction of the base plate 3, and biased to a disk-insert direction (the upper side in FIG. 4) by a spring (not shown).

Figure 8:
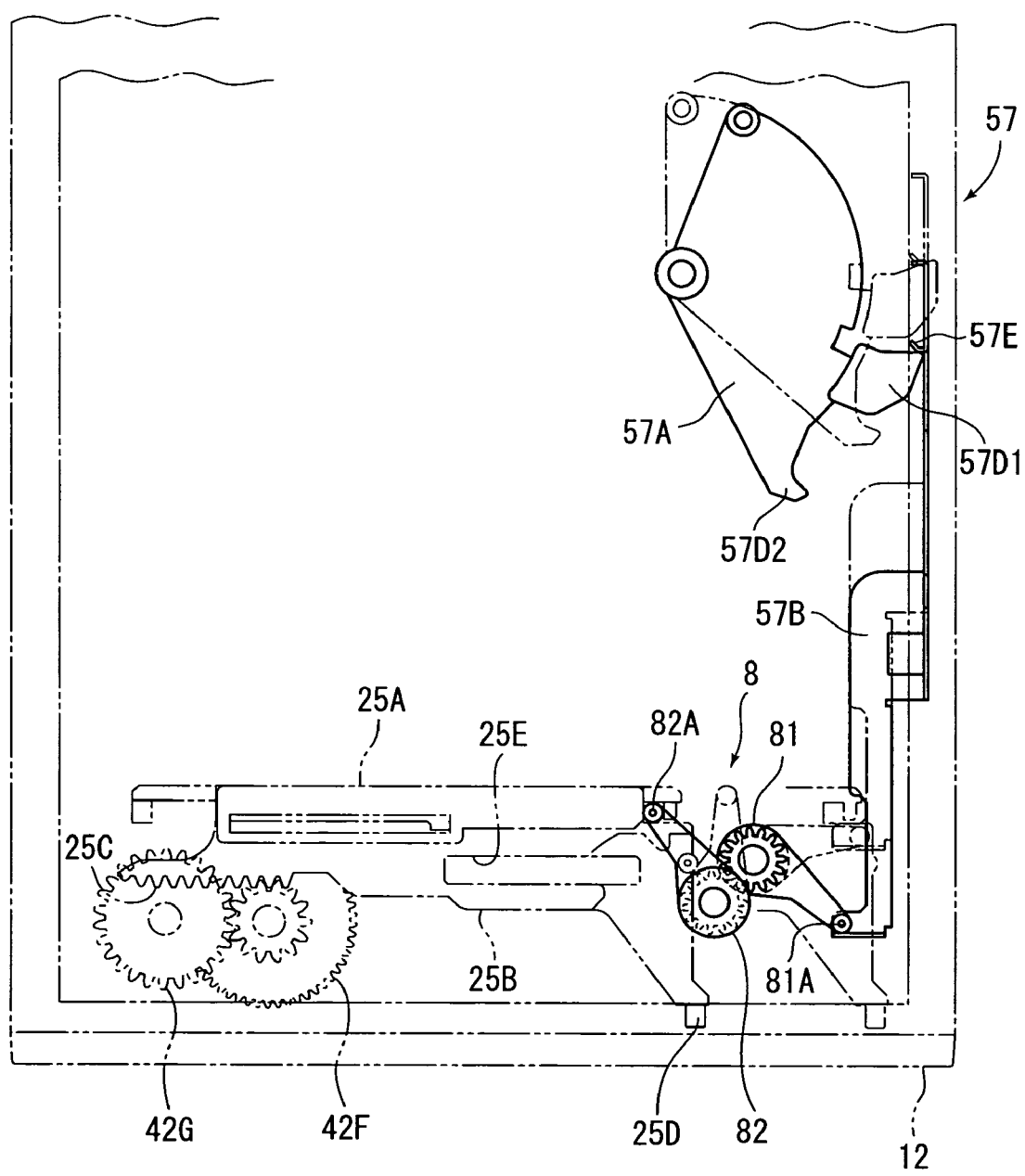
FIG. 8 is a plan view showing an interlock mechanism.

When the slider 57B moves to the disk-eject direction (the lower side in FIG. 4) against biasing force of the spring, the abutment portion 57E abuts on the engagement pieces 57D of the turn plate 57A to move the selector plate 51 toward the right side in FIG. 4 (see FIG. 8). For allowing the selector plate 51 to move to the right side, each of the engagement holes 511 and 512 is shaped in an elongated hole so that the pin body 55A of the engagement pin 55 can move.

The base-plate advancement unlock mechanism 58 allows the advancement of the base plate 3 only when the eject arm 52 and the main arms 53 and 54 hold the disk at a predetermined position, the base-plate advancement unlock mechanism 58 including a bridge plate 581 and a bridge cam 582 formed between the selector plate 51 and the base plate 3.

The bridge plate 581 is an elongated plate-shaped member attached along a rear edge of the base plate 3 to be advancable and retractable in a lateral direction in FIG. 4. A left end thereof is coupled with the base plate 3 through a coil spring 58A whereas a right end thereof has a holding portion 58B.

The holding portion 58B can abut on a holding block 11A integrally formed with the hosing 11. When the holding portion 58B is held by the holding block 11A, the movement of the base plate 3 to the disk-insert direction is restricted.

The bridge plate 581 includes a pin-shaped cam portion 581A at a position facing a lateral edge of the bridge cam 582. When the cam portion 581A engages with cam faces 582A and 582B formed on the lateral edge of the bridge cam 582, the bridge plate 58 moves to the left side against biasing force of the coil spring 58A to be unlocked from the holding block 11A.

When the small disk, which is held in correct orientation by the main arms 53 and 54, pushes in the eject arm 52, the cam face 582A of the bridge cam 582 engages with the cam portion 581A to move the bridge plate 581. When the large disk, which is held in correct orientation by the main arms 53 and 54, pushes in the eject arm 52, the cam face 582B of the bridge cam 582 engages with the cam portion 581A to move the bridge plate 581.

With this configuration, when the disk is inserted in correct orientation, the eject arm 52 moves to the disk-insert direction and therefore the bridge plate 58 moves to the left side to be unlocked. On the other hand, when the disk is inserted in incorrect orientation, the eject arm 52 can not move smoothly to the disk-insert direction and therefore the bridge plate 58 does not move and remains locked.

Between the bridge cam 582 and the selector plate 51, there is a spring 583 for biasing the bridge cam 582 to a direction away from the cam portion 581A.

The stop mechanism 59, as shown in FIGS. 5A, 5B and 6, includes engagement recesses 51E and 51F formed on the selector plate 51 and the engagement pin 55 that engages with the engagement recesses 51E and 51F.

Since the stop mechanism 59 stops two types of disk, i.e., the small disk and the large disk so that the respective disks are held by the eject arm 52 and the main arms 53 and 54, the engagement recesses 51E and 51F are formed at different points. In other words, the engagement recess 51E out of the recesses 51E and 51F is located at a position for stopping the large disk while the engagement recess 51F is located at a position for stopping the small disk.

The engagement recess 51E, as shown in FIG. 5A, includes a flat section 51G that faces a tip end of the pin body 55A, and an inclined section 51H that is connected to the flat section 51G and to a plane facing the eject arm of the selector plate 51. The inclined section 51H is formed along a direction in which the selector plate 51 moves when the main arms 53 and 54 are opened. The engagement recess 51F, just like the engagement recess 51E, includes a flat section and an inclined section.

Figure 7:
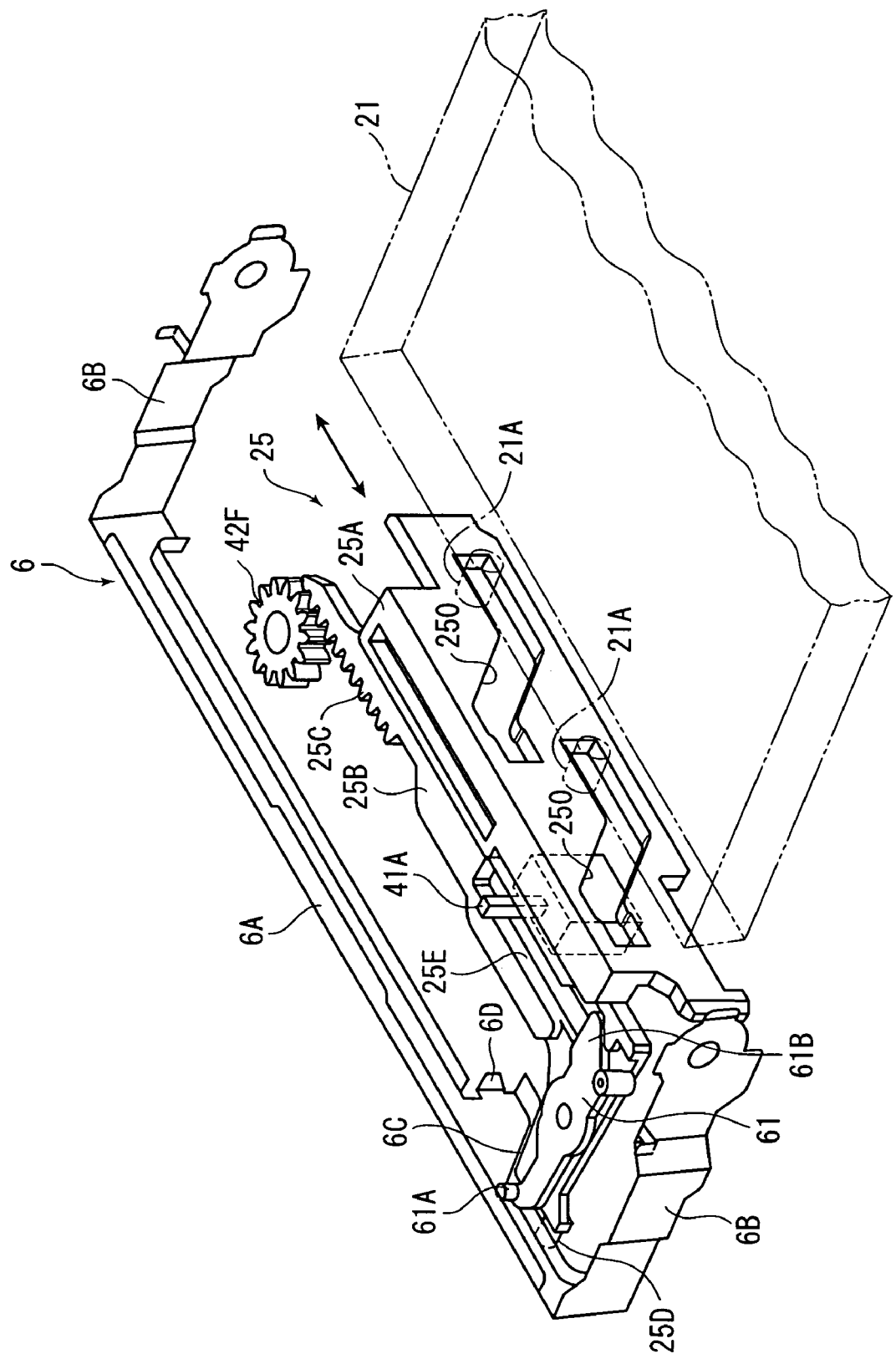
FIG. 7 is a perspective view showing a swing mechanism and a shutter.

FIG. 7 shows detailed structure of the swing mechanism 25 and the shutter 6.

In FIG. 7, the swing mechanism 25 includes a clamp cam 25A that is reciprocally movable in the direction orthogonal to the advancement and retraction direction of the base plate 3, and two pins 21A that are formed at the other end of base 21 and guided by cam grooves 250 formed on the clamp cam 25A. When the clamp cam 25A moves to the left side in FIG. 7 (the right side in FIG. 2) with the recording/reproducing mechanism 2 not being in operation, the other end of the base 21 is lowered. Conversely, when the clamp cam 25A moves to the right side in FIG. 7 (the left side in FIG. 2) with the recording/reproducing mechanism 2 being in operation, the other end of the base 21 is raised.

In the present embodiment, an operation switching mechanism is provided for switching the advancement and retraction operation of the base plate 3 and the swing operation of the recording/reproducing mechanism 2. Each of the cam grooves 250 includes horizontal sections that allow the clamp cam 25A, with the pin 21A being engaged therewith, to move in accordance with the advancement and retraction of the base plate 3 in horizontal direction (the lateral direction in FIG. 7), and an inclined section that raises and lowers the recording/reproducing mechanism 2, the horizontal sections being continuously formed on both sides of the inclined section.

The clamp cam 25A includes a coupling section 25B. The coupling section 25B includes a rack portion 25C that meshes with the forth gear 42F and a holding portion 25D that is projected toward the shutter 6. With the forward and reverse rotation of the forth gear 42F, the clamp cam 25A advances and retracts in a direction indicated by an arrow in FIG. 7. The coupling section 25B has a hole 25E formed along an operation direction of the switch lever 41A so that the switch lever 41A can abut on an edge of the hole 25E.

The shutter 6 includes a long shutter body 6A that has enough size to cover the slot 1A and a substantially angular C-shaped cross section, and arm sections 6B that are formed by folding both ends of the shutter body 6A, the arm sections 6B defining turning centers. The shutter 6 covers the slot 1A when the shutter body 6A is at a raised position, whereas it opens the slot 1A when the shutter body 6A is at a lowered position. The shutter body 6A and the arm sections 6B are integrally formed of sheet plate.

The shutter body 6A includes a cam portion 6C that engages with the holding portion 25D for turning the shutter 6 and a holding piece 6D that is adjacent to the cam portion 6C.

The cam portion 6C is so tilted to raise the shutter body 6A when the clamp cam 25A moves to the right side in FIG. 7 with the recording/reproducing mechanism 2 being in operation, and to lower the shutter body 6A when the clamp cam 25A moves to the left side in FIG. 7 with the recording/reproducing mechanism 2 not being in operation.

The holding portion 25D includes a turn cam 61 turnably provided as a coupling mechanism. The turn cam 61 includes a holding portion 61A formed at an end near the shutter body 6A and an abutment portion 61B formed at the other end. When the clamp cam 25A moves to the right side in FIG. 7 and reaches the stroke end, the holding portion 61A abuts on the holding piece 6D and turns. Then the abutment portion 61B knocks down the switch lever 41A to the right side in FIG. 7, so that the motor 41 of the loading mechanism 4 stops driving. In accordance with this operation of switch lever 41A, the recording/reproducing mechanism 2 starts driving.

FIG. 8 shows structure of an interlock mechanism 8 that interlocks with the arm unlock mechanism 57.

In FIG. 8, the interlock mechanism 8 includes a first gear member 81 having a pin 81A engagable with an end of the slider 57B and a second gear member 82 that meshes with the first gear member 81. The second gear member 82 includes an engagement pin 82A engagable with the clamp cam 25A.

In the interlock mechanism 8, after the base plate 3 has reached the advancement position, the engagement pin 82A engages with the continuously moving clamp cam 25A and turns the second gear member 82. In accordance with this turn of the second gear member 82, the first gear member 81 turns so that the engagement pin 81A moves the slider 57B, thereby activating the arm unlock mechanism 57.

Figure 11:
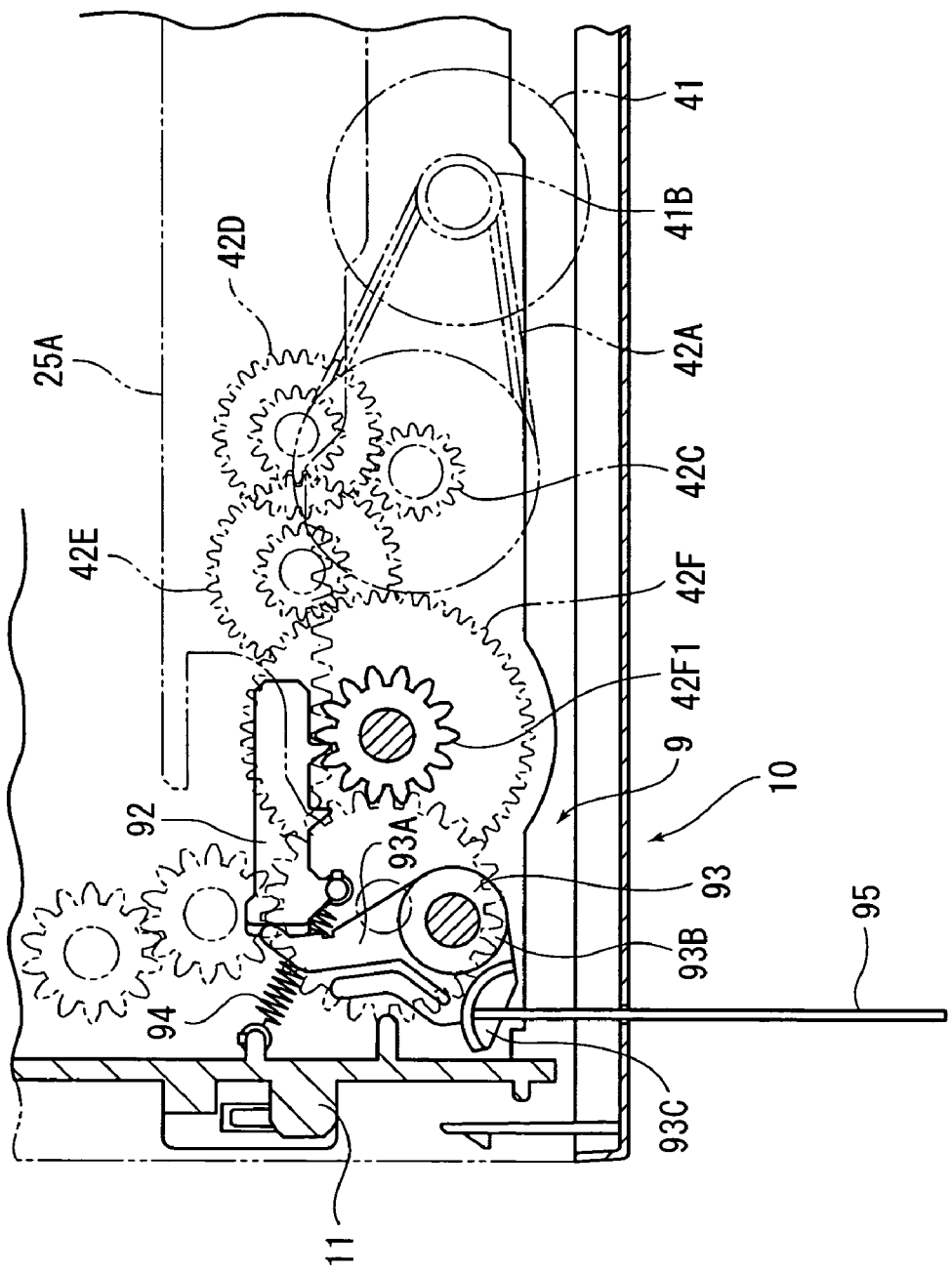
FIG. 11 is a plan view showing a primary portion of a manual eject mechanism.

In FIG. 11, the loading mechanism 4 is provided with a manual eject mechanism 9 for manually ejecting the hold assembly 5.

The manual eject mechanism 9 is mainly consisted of a rack-shaped one-way clutch 92 that meshes with a gear portion 42F1 formed to be coaxial with the forth gear 42F and an eject member 93 that advances and retracts the one-way clutch 92.

Figure 9:
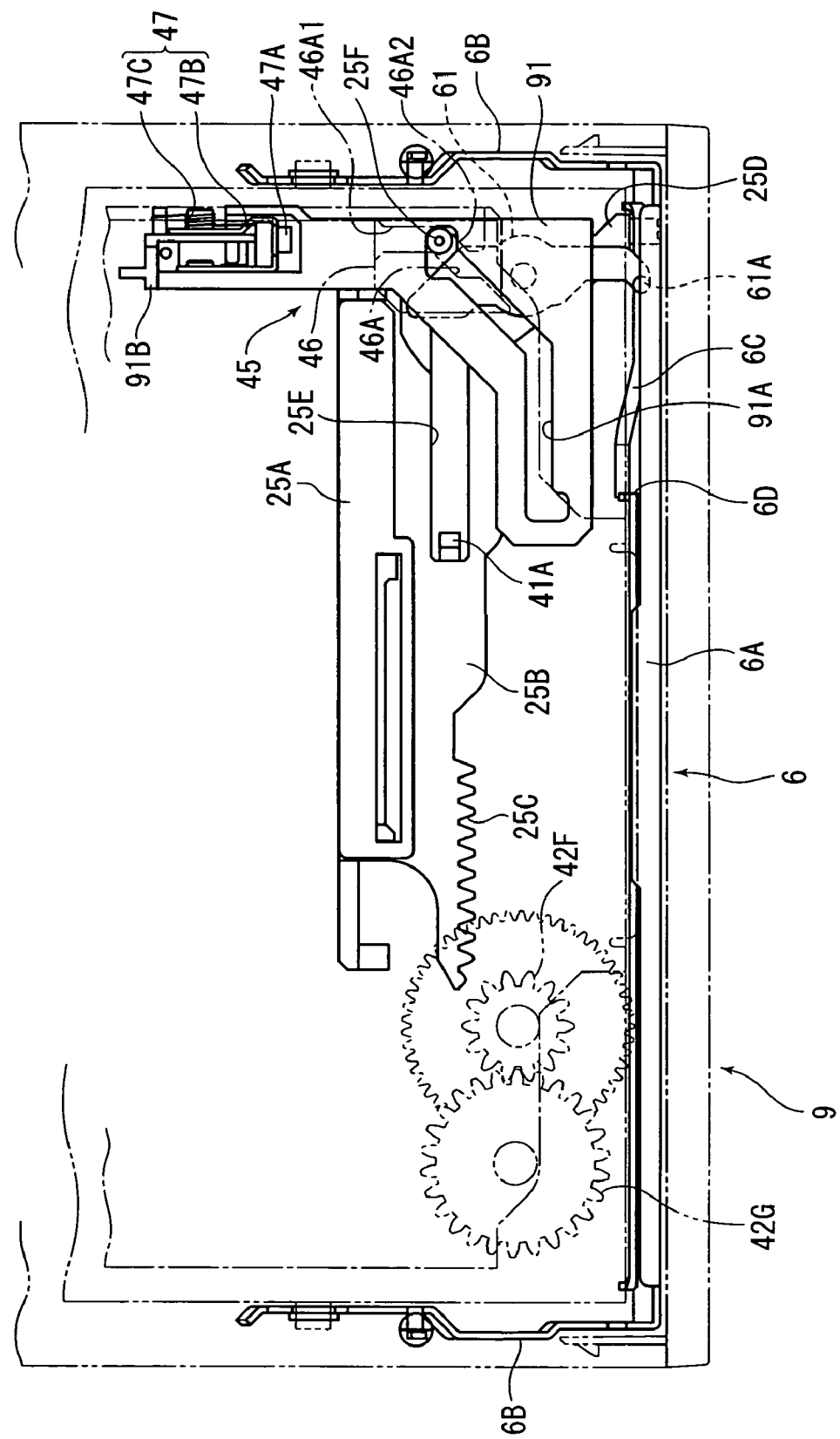
FIG. 9 is a plan view showing the shutter and a start cam mechanism.

A cam member 91, as shown in FIG. 9, has a substantially L-shape in plan view, and includes a cam groove 91A inside thereof to engage with a pin-shaped engagement portion 25F projected from the clamp cam 25A. The cam member 91 moves to the disk-eject direction as the clamp cam 25A moves to the right side in FIG. 2.

FIG. 11 shows structure of the one-way clutch 92 and the eject member 93.

In FIG. 11, the one-way clutch 92, which has a tilted gear portion, transfers the drive only for moving the clamp cam 25A to a predetermined direction (the right side in FIG. 2), but does not transfer the drive when the one-way clutch 92 moves to the opposite direction.

The one-way clutch 92 is coupled with the housing 11 and a coil spring 94 at an end so as to always move back to its original position.

The eject member 93, which is adapted to eject the disk by a plurality of pushing operations, includes a press portion 93A for pressing the end of the one-way clutch 92, a turn portion 93B integrally formed with the press portion 93A, and a pin abutment portion 93C integrally formed with the turn portion 93B for carrying out turning operation with a pin 95. The eject member 93 is formed in an appropriate shape, e.g., a lever-shape.

When the eject member 93 is pushed plural times, the base plate 3 moves to the disk-eject direction. In accordance with this movement of the base plate 3, the turn plate 57A of the arm unlock mechanism 57 turns in counterclockwise direction in FIG. 2 to close the main arms 53 and 54.

In the present embodiment, a disk lock mechanism 10 is provided for locking the disk when the eject member 93 is manually pushed.

Figure 10:
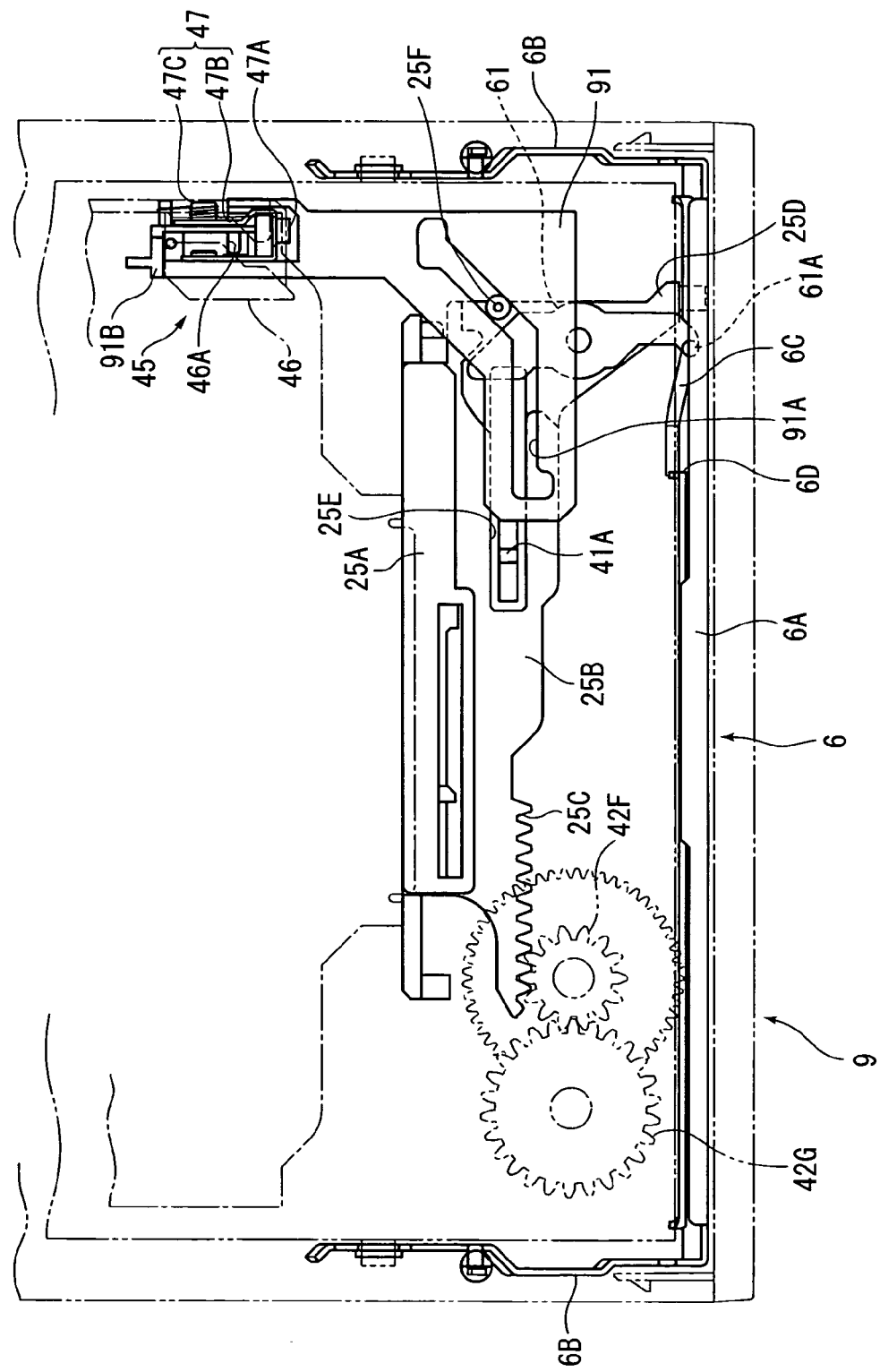
FIG. 10 is another plan view showing the shutter and the start cam mechanism.

In FIGS. 9 and 10, between the base plate 3 and the gear mechanism 42, there is provided a start cam mechanism 45 for starting the rotation of the motor 41 when the base plate 3 advances to a predetermined position.

The start cam mechanism 45 is a start mechanism that includes a start cam 46 formed under a slot-side end of the base plate 3, a cam member 91 having an engagement portion 25F that engages with the start cam 46, a base lock 47 formed on the cam member 91, and a clamp cam 25A that engages with the cam member 91.

The start cam 46 is a thick-plate with a substantially rectangular shape in plan view, and includes a cam groove 46A on its under surface that engages with the engagement portion 25F. The cam groove 46A includes a linear groove 46A1 along the advancement and retraction direction of the base plate 3 and an inclined groove 46A2 for moving the engagement portion 25F to the left side in FIG. 9. When the base plate 3 is manually pushed in (or advanced), the engagement portion 25F disengages from the linear groove 46A1 to engage with the inclined groove 46A2. Accordingly, the clamp cam 25A positioned at the rightmost in FIG. 9 moves to the left side and the switch lever 41A is shifted to start the rotation operation of the motor 41.

In FIGS. 9 and 10, an advancement direction end (the upper end in FIG. 9) of the start cam 46 can be held by a holding projection 91B formed at the end of the cam member 91 whereas a retraction direction end thereof (the lower end in FIG. 9) can be held by the base lock 47.

The base lock 47 includes a base lock body 47B which is turnably formed so that a holding claw 47A for holding an end of the start cam 46 appears from and goes under an upper surface of the cam member 91, and a spring 47C which biases the base lock body 47B so that the holding claw 47A goes under the upper surface of the cam member 91.

As shown in FIGS. 12A and 12B, a guide portion 47D is formed at the opposing side of the holding claw 47A on a bottom surface of the base lock body 47B, and guided onto an upper surface of a guide member 11B formed on the housing 11. Accordingly, when the base lock 47 is located at a position shown in FIG. 9, the holding claw 47A stays under the upper surface of the cam member 91 (see FIG. 12A). When the cam member 91 is advanced and located at a position shown in FIG. 10, the guide portion 47D is guided by the guide member 11B, so that the holding claw 47A projects from the upper surface of the cam member 91 to sandwich the start cam 46 with the holding projection 91B (see FIG. 12B).

Operation of the present embodiment will be described hereunder with reference to FIGS. 13 to 21.

Firstly, a method for placing a large disk D in the slot-in type reproducing/recording apparatus is explained referring FIGS. 13 to 17.

When inserting the large disk D into the slot 1A of the slot-in type reproducing/recording apparatus, a user pushes the disk D onto the main arms 53 and 54 to open them and pushes it onto the eject arm 52.

Figure 13:
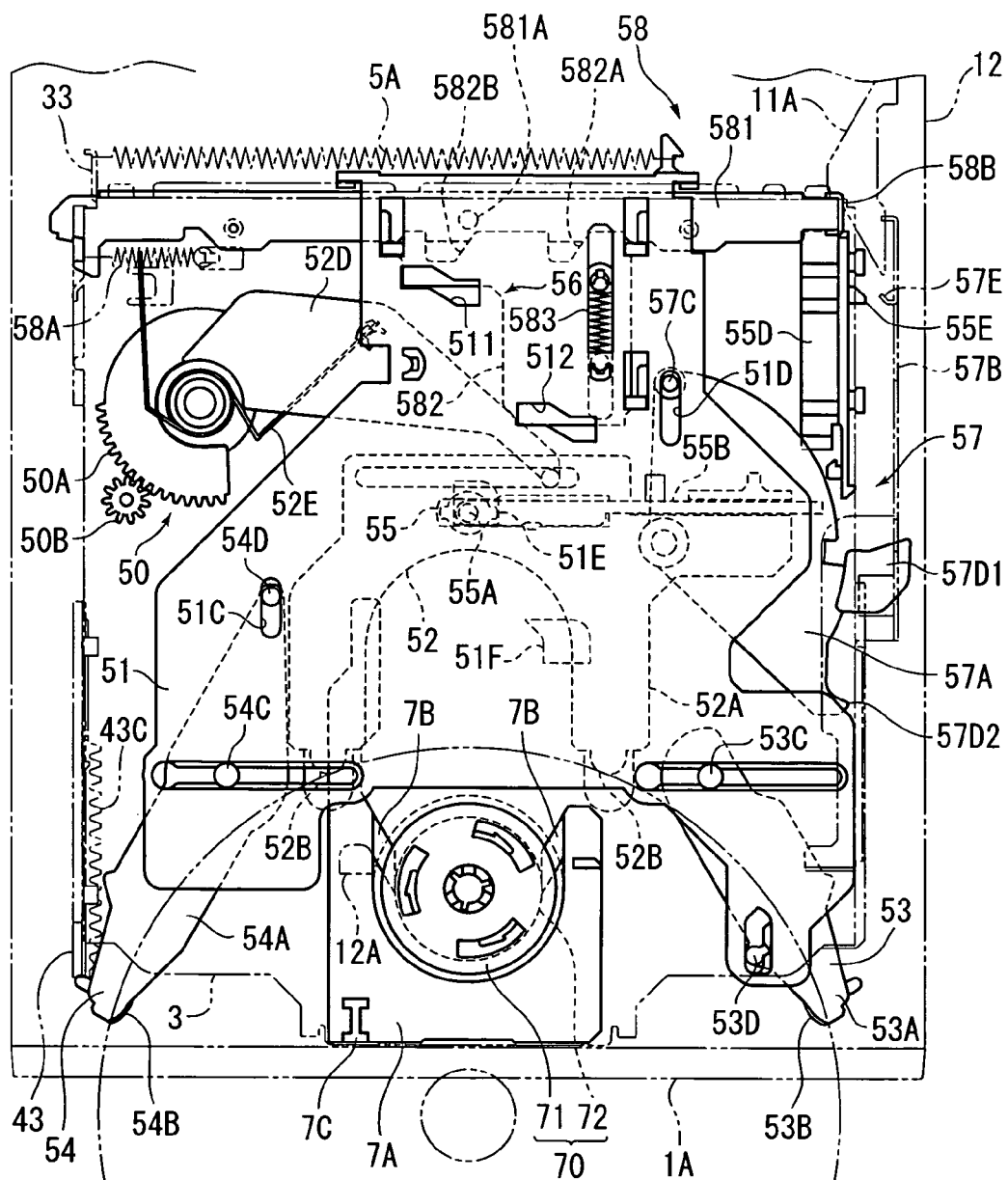
FIG. 13 is a plan view illustrating a method for placing a large disk.

Then, as shown in FIG. 13, the abutment portions 53B and 54B of the main arms 53 and 54 are opened, so that the selector plate moves to the right side in the drawing against the biasing force of the coil spring 5A meanwhile the eject arm 52 advances to the upper side in FIG. 13 against the biasing force of the spring 52E.

Figure 14:
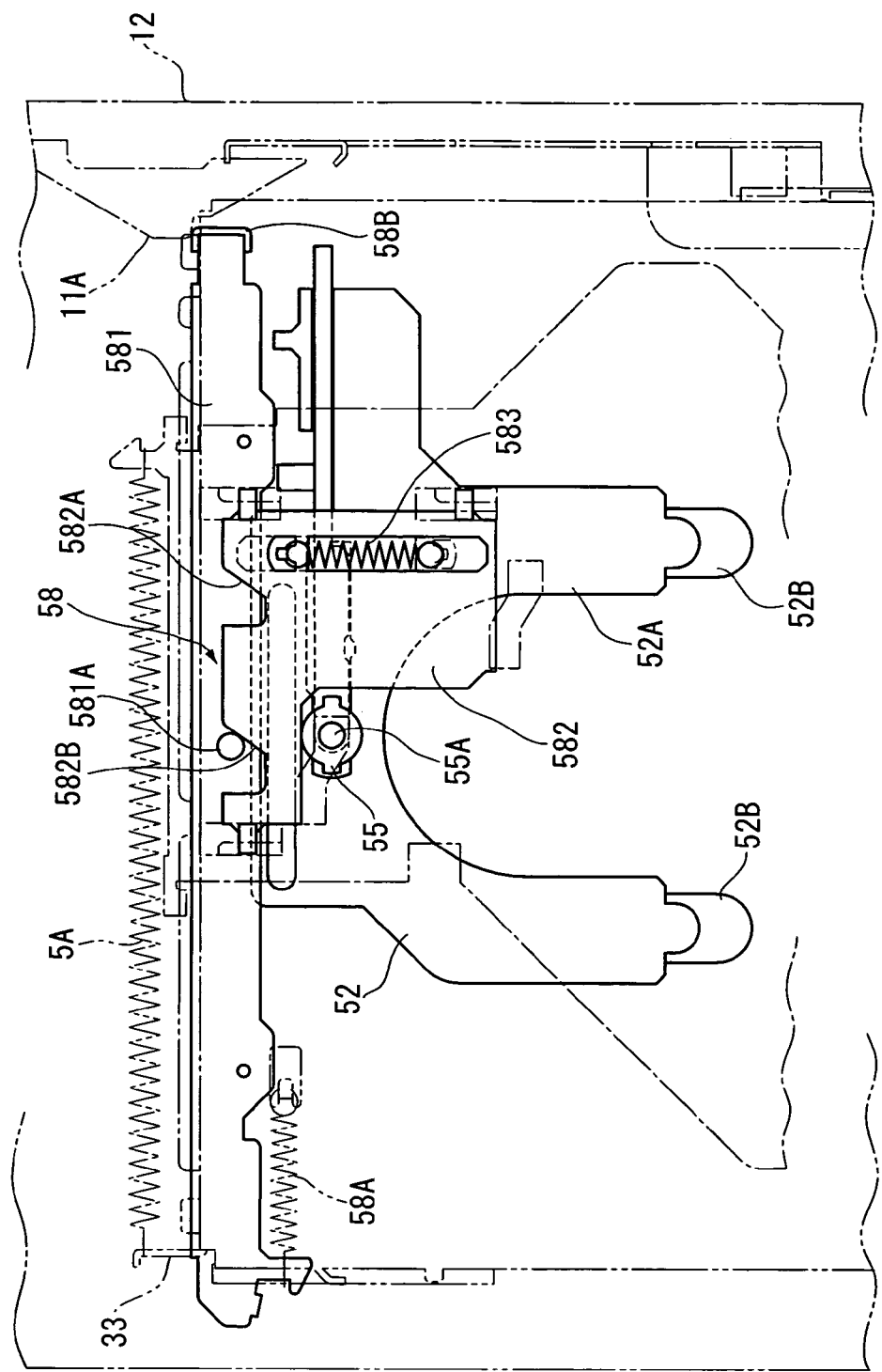
FIG. 14 is a plan view of a primary portion illustrating the method for placing the large disk.

When the user further pushes in the disk D so that the disk D advances to reach a predetermined position, the eject arm 52, as shown in FIG. 14, advances the bridge cam 582 against the biasing force of the spring 583 and the cam face 582B of the bridge cam 582 engages with the cam portion 581A of the bridge plate 581. In result, the bridge plate 581 moves to the left side in FIG. 14 against the biasing force of the spring 58A, so that the lock between the holding portion 58B and the holding block 11A of the housing 11 is released. The release of the lock enables further advancement of the base plate 3.

Figure 15:
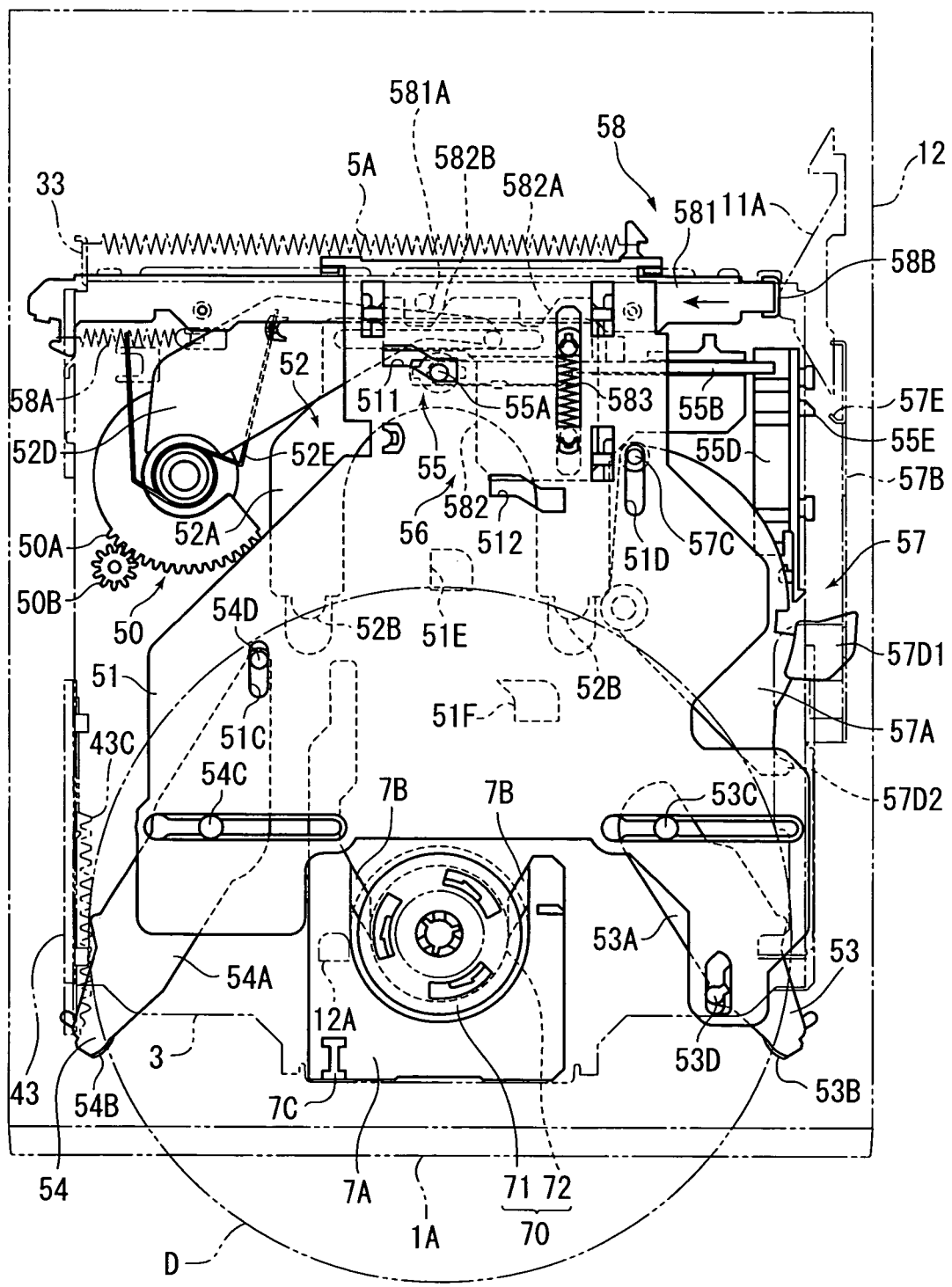
FIG. 15 is another plan view illustrating the method for placing the large disk.

At the substantially same time of this operation, the pin body 55A of the eject arm 52, as shown in FIG. 15, engages with the engagement hole 511. Accordingly, the arm lock mechanism 56 functions, so that the disk D is held by the eject arm 52 and the main arms 53 and 54.

As described above, when the disk D is pushed in, the base plate 3, to which the arms 52 to 54 are attached, advances. During this advancement, a load required for advancing the base plate 3 is small since the folded sections 32 of the base plate 3 have grooves 32A formed along the advancement and retraction direction of the rack 43.

While the base plate 3 continues to advance after the release of the lock of the base plate 3, the engagement portion 25F of the clamp cam 25A is moved to the left side in FIG. 9 by the start cam 46 formed on the base plate 3. Accordingly, the switch lever 41A moves from the right to the center to start the rotation of the motor 41.

The rotation of the motor 41 is transmitted to the rack 43 through the gear mechanism 42, so that the rack 43, the base plate 3 and the hold assembly 5 holding the disk D continue to advance.

In course of the advancement of the base plate 3, the start cam 46 pushes in the holding projection 91B so that the base plate 3 advances the cam member 91. In result, the cam groove 91A of the cam member 91 engages with the engagement portion 25F of the clamp cam 25A to move the clamp cam 25A to the left side, and then the rack portion 25C meshes with the forth gear 42F of the gear mechanism 42. With this state, since the motor 41 has already started rotating and the gear mechanism 42 is in operation, the clamp cam 25A continues to move to the left and the cam member 91 also continues to advance. In the mean time, the base lock 47 sandwiches the start cam 46 with the holding projection 91B and thus advances it. Therefore, the hold assembly 5 advances even when the mesh between the rack 43 and the gear mechanism 42 is released. Note that the base plate 3 does not move since the base lock 47 and the holding projection 91B sandwich the start cam 46 even when the recording/reproducing mechanism 2 is in operation.

Figure 16:
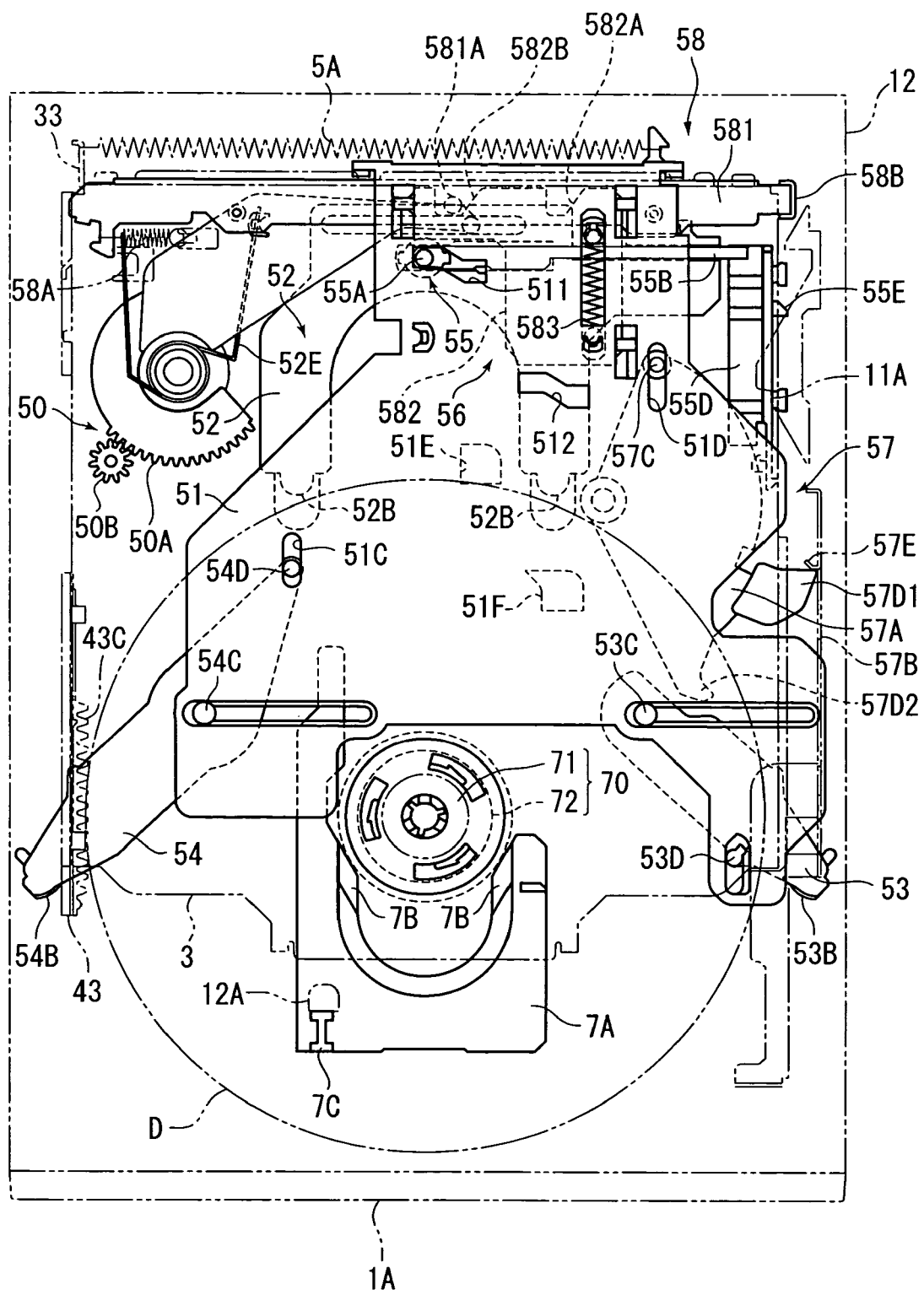
FIG. 16 is a further plan view illustrating the method for placing the large disk.
Figure 17:
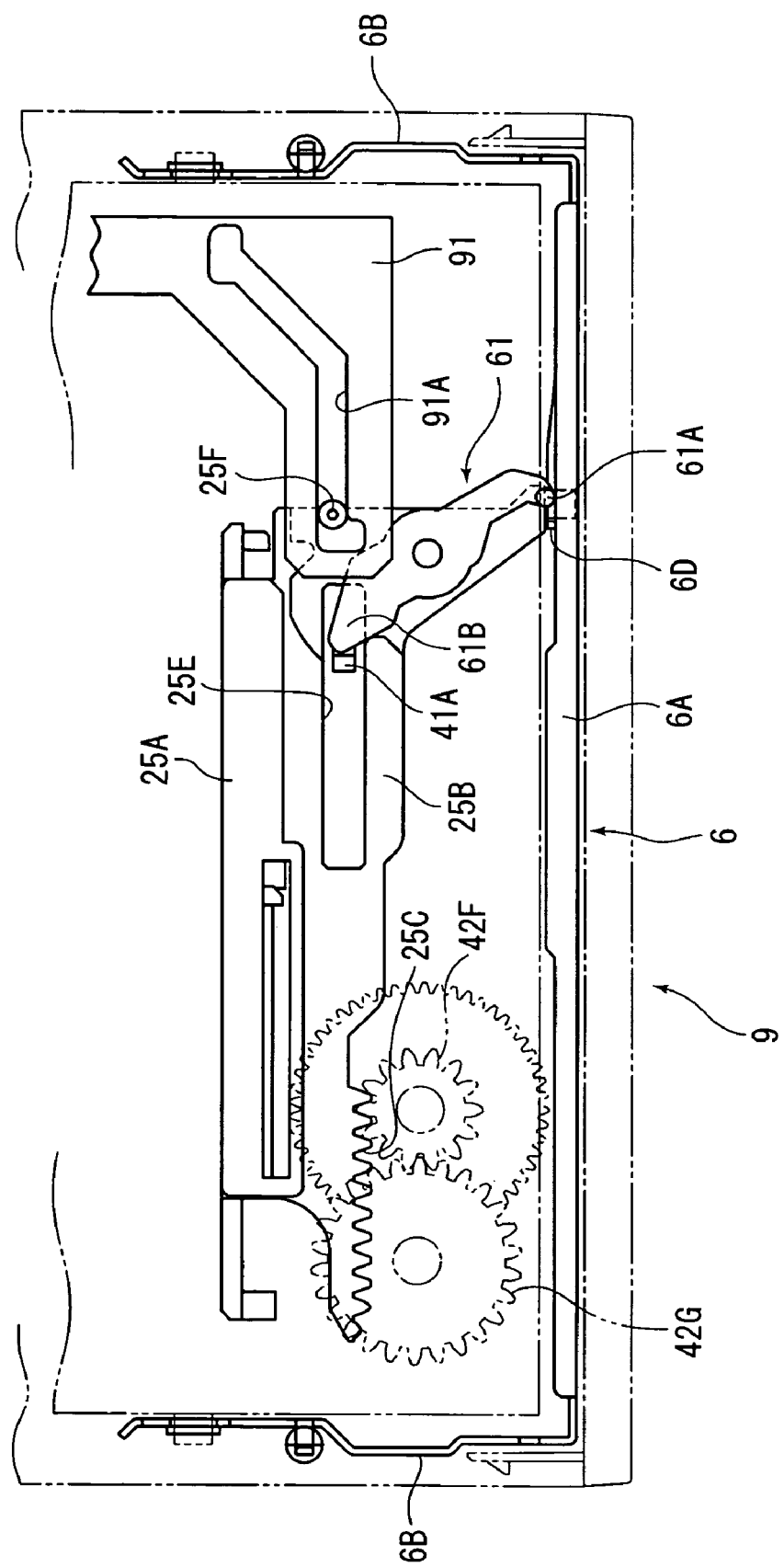
FIG. 17 is a plan view showing a coupling mechanism (turn cam) in operation.

In course of the advancement of the base plate 3, the clamper hold mechanism 7, as shown in FIG. 16, is activated so that the clamper 70 is disengaged from the holder 7A to face the center of the disk.

When the clamp cam 25A continues to move to the left, the swing mechanism 25 is activated so that the base portion 21 is raised, then the recording/reproducing mechanism 2 gets into a condition where the reproducing and/or recording is enabled. When the recording/reproducing mechanism 2 moves closer to a recording/reproducing position, the magnet in the rotary table 22 sticks to the clamper 70 over the disk D to clamp the disk D.

Concurrently with the clamp of the disk D, the main arms 53 and 54 open so that the abutment portions 53B and 54B move away from the disk D. In other words, when the clamp cam 25A continues to move to the left side and the slider 57B moves to the lower side in FIG. 16 through the interlock mechanism 8, the slider 57B engages with the engagement piece 57D1 to turn the turn plate 57A in clockwise direction. When the turn plate 57A is turned, the selector plate 51 moves to the right side in the drawing to open the main arms 53 and 54.

At the same time when the advancement of the base plate 3 ends and the recording/reproducing mechanism 2 swings to the recording/reproducing position, the shutter 6 closes the slot 1A. In other words, as the clamp cam 25A moves to the left side, the engagement position of the holding portion 25D and the cam portion 6C changes so that the shutter 6 turns to close the slot 1A. When the clamp cam 25A further continues to move, the turn cam 61 formed on the clamp cam 25A turns in counterclockwise direction in FIG. 17 as the holding portion 61A thereof abuts on the holding piece 6D. The abutment portion 61B shifts the switch lever 41A so as to send a command for stopping the rotation to the motor 41.

When the drive of the recording/reproducing mechanism 2 ends, the user presses an eject button (not shown) to rotate the motor 41 in reverse direction. Then the motor 41 rotates in reverse direction, so that the clamp cam 25A moves to the right side in the drawing. The slider 57B, through the interlock mechanism 8 coupled with the clamp cam 25A, moves to the upper side in FIG. 16, so that the turn plate 57A turns in counterclockwise direction in the drawing with the biasing force of the coil spring 5A and the selector plate 51 moves to the left side in the drawing. Accordingly, the main arms 53 and 54 close to hold the disk D.

At the substantially same time when the disk D is held, the clamp cam 25A moves to the right side, thus the recording/reproducing mechanism 2 swings back to its initial position. Then the shutter 6 opens the slot 1A.

When the clamp cam 25A further moves to the right side, the cam member 91 retracts. Accordingly, the holding projection 91B formed on the cam member 91 pushes the start cam 46 to the front side in the drawing to retract the base plate 3.

When the clamp cam 25A further moves to the right side, the rack 43 meshes with the seventh gear 421 of the gear mechanism 42. Immediately after this meshing, the forth gear 42F can not mesh with the rack portion 25C and the clamp cam 25A stops. However, as the seventh gear 421 of the gear mechanism 42 meshes with the rack 43, the base plate 3 continues to retract. Note that the rack 43 can move in the advancement and retraction direction because of the grooves 32A formed on the base plate 3, operation stop due to a slip onto the gear is avoided.

The base plate 3 continues to retract as the seventh gear 421 meshes with the rack 43, and then the clamper hold mechanism 7 is activated so that the holder 7A holds the clamper 70.

When the base plate 3 retracts to a predetermined position, the projection 55E abuts on a projection (not shown) formed on the housing 11 and the cam member 55D stops. On the other hand, since the base plate 3 continues to retract, the tip end of the engagement pin 55 moves along the cam face of the cam member 55D so that the pin body 55A is disengaged from the engagement hole 511. Then the arm member 52D pushes out the disk D with the eject arm 52 toward the slot with the biasing force of the spring 52E.

At the substantially same time when the engagement pin 55 is disengaged from the engagement hole 511, the base plate 3 moves back to the initial position. The start cam 46 moves the clamp cam 25A to the right side, so that the switch lever 41A is shifted to stop the rotation of the motor 41.

When the base plate 3 moves toward the slot 1A (or retracts) and the eject arm 52 is located at a predetermined position, the engagement pin 55 attached to the eject arm 52 enters the engagement recess 51E to abut on a lateral wall of the recess and gets held therein. This prohibits the disk D jumping out from the slot 1A.

When the thus stopped disk D is pulled out, the coil spring 5A of the selector plate 51 biases the main arms 53 and 54 to their closing direction. Therefore, the selector plate 51 moves to the left side. Since the engagement recess 51E, which is formed on the selector plate 51, has its right side defining an inclined surface, the tip end of the engagement pin 55 passes thought the inclined surface and the eject arm 52 moves toward the slot 1A. Thus, the eject arm 52 and the main arms 53 and 54 move back to the positions where they are located before the insertion of the disk D.

As a method for placing a small disk D in the slot-in type reproducing/recording apparatus is almost the same as the method for the large disk, it is briefly explained referring FIGS. 18 to 21.

Figure 18:
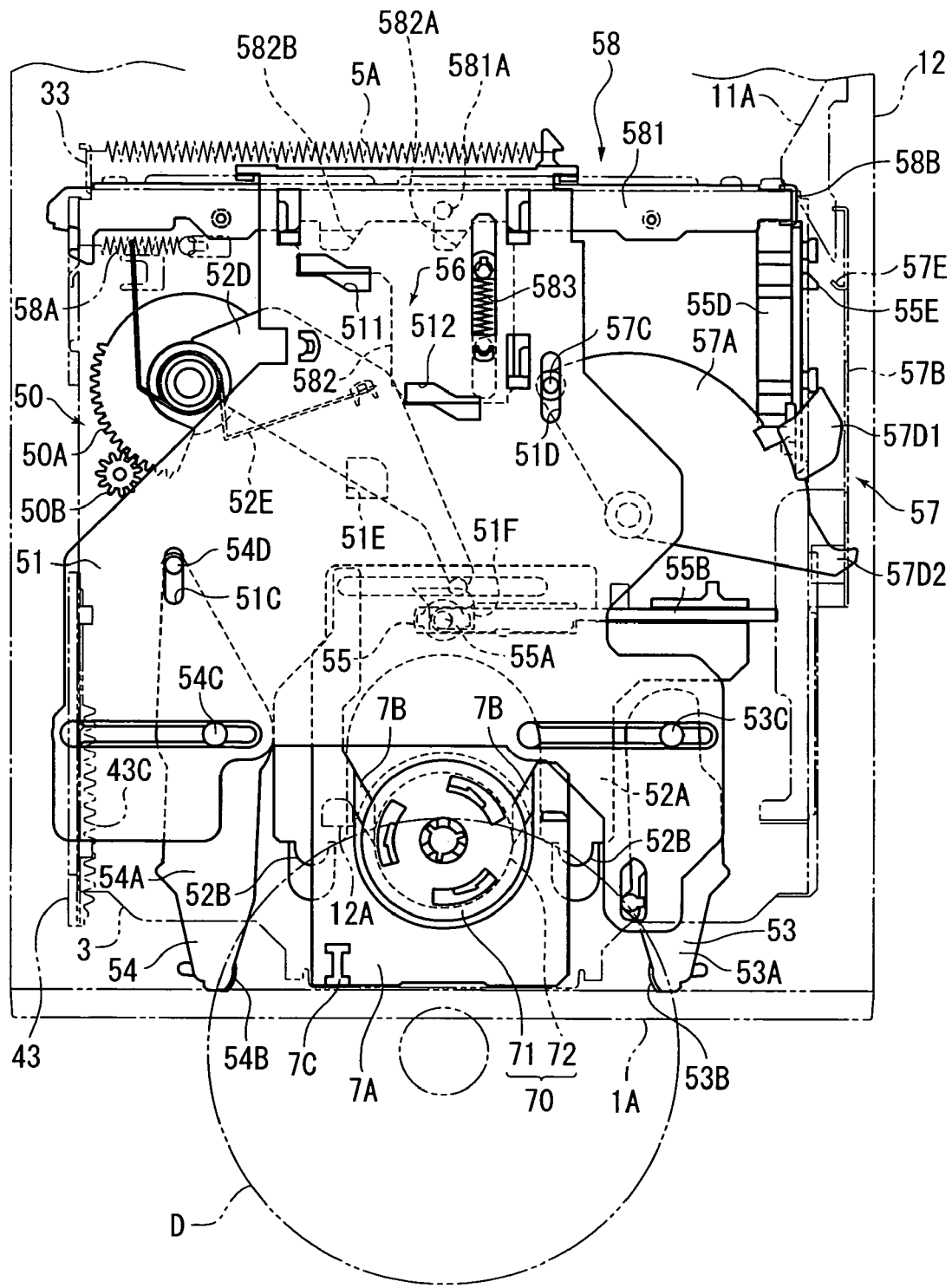
FIG. 18 is a plan view illustrating a method for placing a small disk.

As shown in FIG. 18, just like the case of the large disk D, the user pushes the small disk D onto the main arms 53 and 54 to open them and pushes it onto the eject arm 52.

Figure 19:
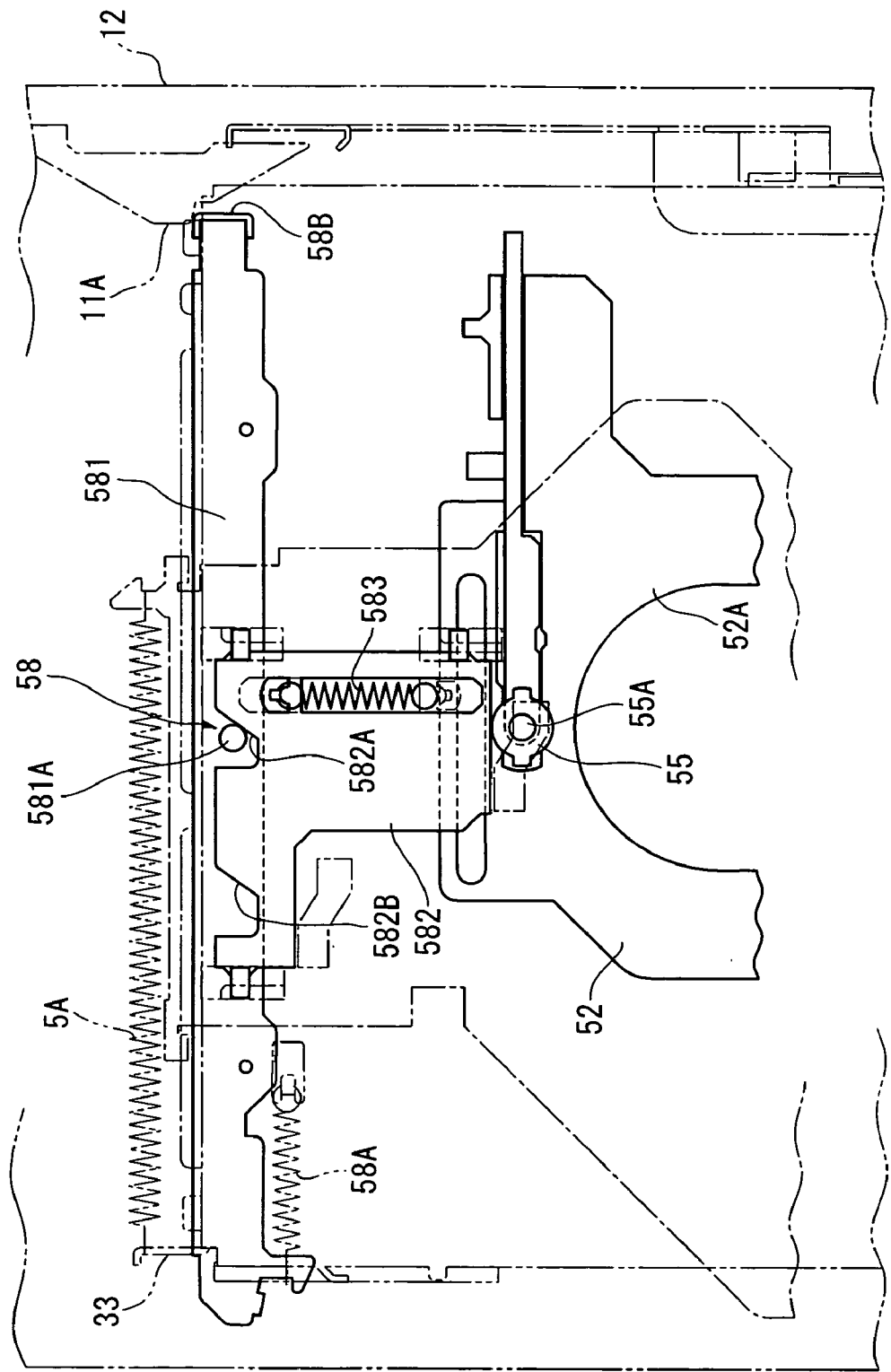
FIG. 19 is a plan view of a primary portion illustrating the method for placing the small disk.

When the user further pushes in the disk D, the eject arm 52, as shown in FIG. 19, advances the bridge cam 582. Unlike the case of the large disk D, the cam face 582A of the bridge cam 582 engages with the cam portion 581A of the bridge plate 581. In result, just like the case of the large disk D, the lock between the holding portion 58B and the holding block 11A of the housing 11 is released.

Figure 20:
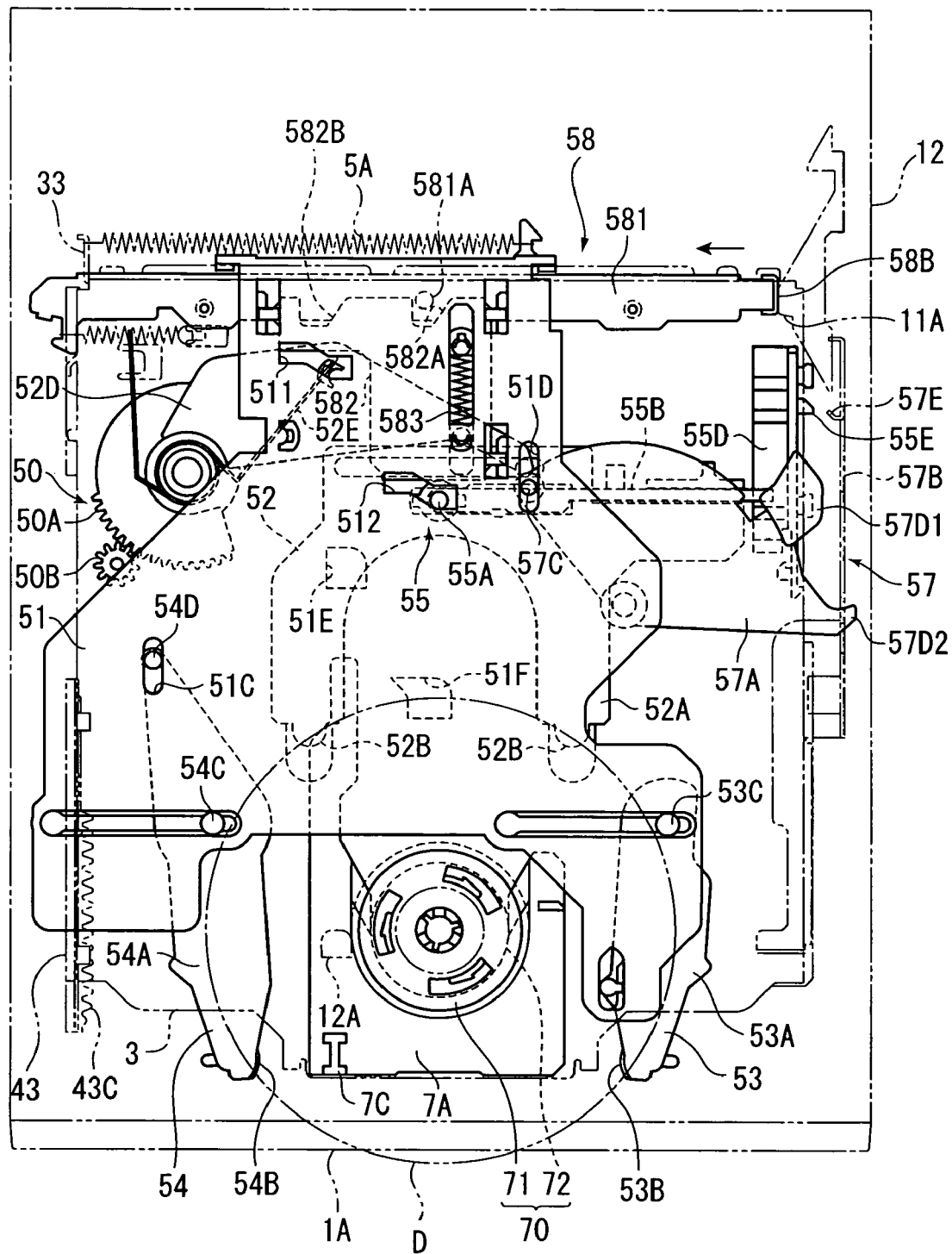
FIG. 20 is another plan view illustrating the method for placing the small disk.
Figure 21:
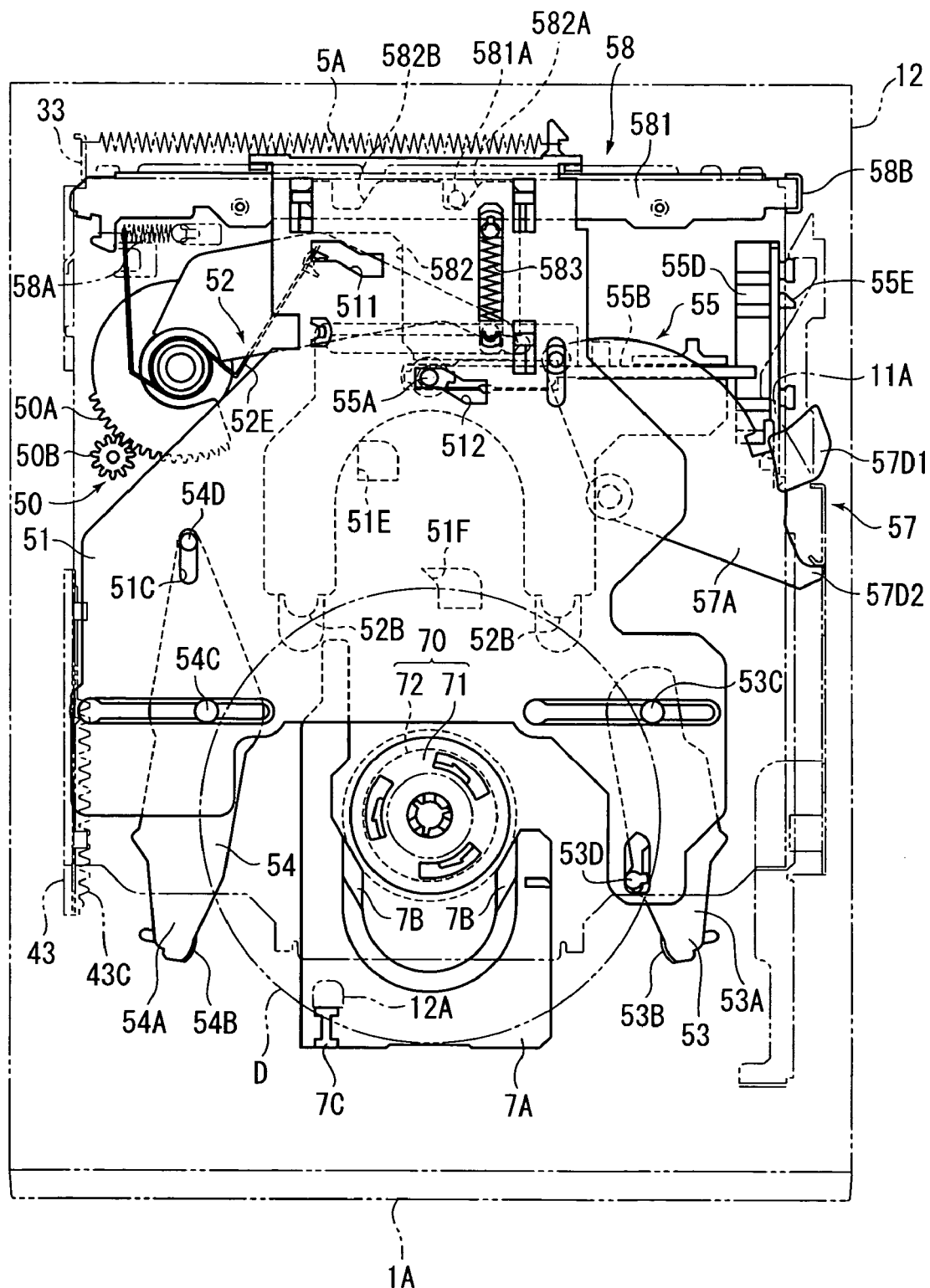
FIG. 21 is a further plan view illustrating the method for placing the small disk.

At the substantially same time of the release of the lock, the pin body 55A of the eject arm 52, as shown in FIG. 20, engages with the engagement hole 512, so that the small disk D is held by the eject arm 52 and the main arms 53 and 54.

When the recording/reproducing mechanism 2 moves closer to the recording/reproducing position, the magnet in the rotary table 22 sticks to the clamper 70 over the disk D to clamp the small disk D.

Concurrently with the clamp of the small disk D, the main arms 53 and 54 open so that the abutment portions 53B and 54B move away from the small disk D. In other words, when the clamp cam 25A continues to move to the left side and the slider 57B moves to the lower side in FIG. 21 through the interlock mechanism 8, the slider 57B engages with the engagement piece 57D2 to turn the turn plate 57A in clockwise direction.

Steps after ending of the drive of the recording/reproducing mechanism 2 are the same as those for the large disk D. When the eject arm 52 stops pushing out operation, the engagement pin 55 attached to the eject arm 52 enters the engagement recess 51F to abut on a lateral wall of the recess and gets held therein.

According to the above-described present embodiment, the following advantages can be obtained.

(1) There are provided the apparatus body 1 that has the slot 1A provided for inserting and ejecting the disk D and the case provided inside the apparatus body 1 for accommodating the disk D, the recording/reproducing mechanism 2 for recording on and/or reproducing from the disk D accommodated in the case, and the loading mechanism 4 for advancing and retracting the case between the position where the disk D faces the recording/reproducing mechanism 2 and the position near the slot 1A. The loading mechanism 4 includes the motor 41, the gear mechanism 42 coupled with the motor 41, and the rack 43 coupled with the gear mechanism 42 and provided along the advancement and retraction direction of the case. Between the rack 43 and the case, the grooves 32A are formed for allowing the relative movement of the rack 43 and the case along the advancement and retraction direction. Between the case and the gear mechanism 42, the start cam mechanism 45 is formed for starting the rotation of the motor 41 when the case advances to the predetermined position. With such configuration, the case, when pushed in, can advance within the length of the grooves 32A without much load, therefore the disk D can be easily loaded with the manual insertion. In other words, since the loading mechanism 4 includes a number of gears making speed reduction ratio high, large pressing force is required for pushing the case to idle the gears. However, with the grooves 32A formed on the case as in the present embodiment, only small force is required for pushing the case to operate the switch.

(2) This embodiment can apply to a tray type one. In the tray type reproducing/recording apparatus, however, since the tray is accommodated inside the apparatus together with a disk, the distance that the tray advances and retracts is long. Also, the tray itself has a lightweight. Therefore, reduction ratio of the gear mechanism is small. As a result, a large load is not required for manually pushing the tray. On the other hand, in the apparatus of this embodiment, since the disk D is pushed into the apparatus to a predetermined position by hand and then advanced by the hold assembly 5, the distance that the hold assembly 5 advances and retracts is shorter than the distance that the tray does. Also, the hold assembly 5 has many components and thus has a heavyweight. Therefore, reduction ratio of the gear mechanism should be high. As a result, a large load is required for manually pushing the hold assembly 5, thus the configuration in which the rack is provided with a play is effective.

(3) There is provided the arm lock mechanism 56 that locks the arms 52 to 54 when the arms 52 to 54 hold the disk D. Therefore, with the arms 52 to 54 being locked, the disk D can be securely conveyed between the slot 1A and the position facing the recording/reproduction mechanism 2.

(4) Since there is the arm unlock mechanism 57 for releasing the lock of the arm lock mechanism 56 to unlock the arms 53 and 54 that hold the disk D, the disk D can be released and easily rotated by the rotary table 22 of the recording/reproducing mechanism 2 upon the recording and/or reproducing of the disk D.

(5) The base plate 3 includes the clamper 70 for holding the disk D during the reproduction/recording and the clamper hold mechanism 7 for moving the clamper 70 toward the disk D when the base plate 3 advances to the recording/reproducing mechanism 2 and for moving the clamper 70 away from the disk D when the base plate 3 retracts toward the slot 1A. Therefore, when the disk D advances to the position facing the recording/reproduction mechanism 2, the clamper 70 clamps the disk D thereby smoothening the reproduction and/or recording of the disk D. Also, the disk D is not interrupted by the clamper 70 when slotted in and out.

(6) Since the apparatus body 1 is provided with the shutter 6 for covering the slot 1A when the recording/reproduction mechanism 2 is in operation and for opening the slot 1A when the recording/reproducing mechanism 2 is not in operation, the user will not mistakenly insert the disk D into the slot 1A where another disk D is already inserted.

Moreover, the shutter 6 is coupled through the turn cam 61 with the switch lever 41A that stops driving the loading mechanism 4 and starts driving the recording/reproducing mechanism 2. Without the shutter 6, it is impossible that the switch lever 41A is shifted to operate the recording/reproducing mechanism 2. Accordingly, the shutter 6 will not be forgotten to be mounted at its manufacturing process.

(7) Since there are provided the three arms 52 to 54 that respectively press the outer circumferential edge of the disk D at different points with the predetermined biasing force, two types disk D, i.e., the small disk D and the large disk D can be held with the biasing force without the arms 52 to 54 touching the surface of the disk D, thereby keeping the disk surface clean. Keeping the surface of the disk D clean avoids lowering accuracy of the reproducing and/or recording.

In addition, there is provided the dumper mechanism 50 for reducing the push-out force of the disk D pushed out by the eject arm 52, which is one of the arms 52 to 54 and adapted to push out the disk D toward the slot 1A. With this configuration, since the disk D does not jumps out from the slot 1A, the disk D is easily handled.

(8) Since the manual eject mechanism 9 is provided for manually ejecting the hold assembly 5, the disk D can be ejected even when the apparatus does not work because of power outrage and the like. Further, the manual eject mechanism 9 includes the eject member 93 that ejects the disk D by a plurality of the pushing operations. Therefore, at the ejection of the disk D, which is still rotating with inertial force, immediately after the power outrage, the disk D will not jumps out only with a single push of the eject member 93. In result, the disk D is easily handled.

(9) Since the disk lock mechanism 10 is provided for locking the disk D when the eject member 93 is pushed, the disk D is forcedly locked so that the disk D is prohibited to jump out from the slot 1A when rotating. This also contributes to easy handling of the disk D.

(10) Since the manual eject mechanism 9 includes the one-way clutch 92 that transfers the drive of the eject member 93 only in the direction in which the eject member 93 is manually pushed, the configuration of the eject member 93, which ejects the disk D by the plurality of pushing operations, can be simplified.

(11) Since the recording/reproducing mechanism 2 is attached to the apparatus body 1 in a manner that an end thereof is turnably supported by the housing 11 while the other end is swingable toward and away form the disk D accommodated in the hold assembly 5, the relative position of the disk D and the recording/reproducing mechanism 2 can be more optimized comparing to an arrangement which drops the disk D toward the recording/reproducing mechanism 2. In result, the reproduction and recording can be accurately performed.

(12) There is provided the stop mechanism 59 including the selector plate 51 formed on the base plate 3, the engagement pin 55 formed on the eject arm 52 and biased toward the selector plate 51, and the engagement recesses 51E and 51F engagable with the engagement pin 55 and formed on the selector plate 51. This stop mechanism 59 can prevent the disk D from jumping out from the slot 1A upon the ejection of the disk D.

(13) Each of the engagement recesses 51E and 51F includes the flat section 51G that faces the tip end of the pin body 55A of the engagement pin 55 and the inclined section 51H that is connected to the flat section 51G and to the plane facing the eject arm 52 of the selector plate 51. Therefore the configuration of the stop mechanism 59 can be simplified.

(14) The eject arm 52 includes the substantially U-shaped arm body 52A having the two abutment portions 52B so as to press the disk D at two points. This configuration enables to push out the disk D straight toward the slot 1A.

(15) Since the main arms 53 and 54 are biased by the coil spring 5A, a turning stroke of the abutment portions 53B and 54B can be widely set. Accordingly, it is possible to hold a plurality of types of the disk D with big diameter difference.

(16) Since the arm lock mechanism 56 includes the engagement holes 511 and 512 which are formed at different positions on the selector plate 51 and the engagement pin 55 of which pin body 55A engages with engagement holes 511 and 512, the engagement pin 55 engages with any of the plurality of engagement holes 511 and 512 formed at different positions when the selector plate 51 moves in accordance with the turn of the main arms 53 and 54. The main arms 53 and 54 are thus correctly locked. Therefore, the configuration of the arm lock mechanism 56 can be simplified.

(17) Since the motor 41 is connected to the controller that controls the initial position of the base plate 3, the motor 41 rotates a little in reverse direction and the rack 43 advances within the length of the grooves 32A after the disk ejection is completed to shift the switch lever 41A. This makes the base plate 3 to always have some play upon its advancement.

(18) There are provided the base plate 3 having the hold assembly 5, the recording/reproducing mechanism 2 for recording on and/or reproducing from the disk D, the loading mechanism 4 for advancing and retracting the base plate 3 between the position where the disk D faces the recording/reproducing mechanism 2 and the position near the slot, and the operation switching mechanism for switching the advancement and retraction operation of the base plate 3 and the swing operation of the recording/reproducing mechanism 2. Therefore the advancement and retraction operation of the base plate 3 and the swing operation of the recording/reproducing mechanism 2 are performed sequentially as a series of operation, but never performed simultaneously. Accordingly, parts consisting of each mechanism do not interfere with each other during the series of the operation, thereby preventing apparatus failure.

(19) Between the selector plate 51 and the base plate 3, the base-plate advancement unlock mechanism 58 is provided that allows the advancement of the base plate 3 only when the three arms 52 to 54 hold the disk D at the predetermined position. With this configuration, the base plate 3 does not advance when the disk D being dispositional, specifically being misaligned from the center of the slot 1A, is pushed into the slot 1A. The same happens when a non-circular disk or a disk with non specified-size is pushed into. Accordingly, apparatus operations associated with the advancement of the base plate 3 are suspended, thereby preventing its failure.

(20) The base-plate advancement unlock mechanism 58 includes the bridge plate 581 that is reciprocally movable in the direction orthogonal to the advancement and retraction direction of the base plate 3 and provided with an end which can be held by the holding block 1A, and the bridge cam 582 that is engagable with the cam portion 581A formed on the bridge plate 581 and moves the bridge plate 581 toward the other end of the bridge plate 581 in accordance with the advancement of the eject arm 52 when the main arms 53 and 54 are at the predetermined positions. Since applying the bridge plate 581 and the bridge cam 582 that are relatively simple in structure, the structure of the base-plate advancement unlock mechanism 58 can be simplified.

Note that the present invention is not limited to the above specified embodiment but includes modifications and improvements as long as objects of the present invention can be attained.

For instance, though the case of the above embodiment includes the hold assembly 5 and the base plate 3 and the reproducing/recording apparatus is a slot-in type one, the case may be a tray for accommodating a disk and the reproducing/recording apparatus may be a tray type one.

The grooves 32A for allowing the relative movement of the rack 43 and the base plate 3 may be provided on the rack 43. Though the two grooves 32A are formed in line along the advancement and retraction direction of the base plate 3, the number of the groove 32A may be one. However, the rack 43 can more surely go straight when two grooves 32A are provided as in the above embodiment.

Though the two types of disk D with different sizes are applied, three or more types of disk D with different sizes or one type of disk D with same size may be applied.

Though the eject arm 52 and the main arms 53 and 54 are respectively biased with springs, elastic members such as rubber may be used instead of the springs.

Though the eject arm 52 is formed in a substantially U-shape having two abutment portions 52B at the tip ends thereof, the eject arm is not necessarily to be in the substantially U-shape and it may have only one abutment portion in the present invention. However, the disk D will more surely goes straight when two abutment portions 52B are provided.

Though the switch lever 41A performs switching operation at three positions, i.e., the center position for turning the motor 41 and the both left and right side positions for stopping the turn, the switch lever 41A for performing it at two positions may be applicable in this invention. For instance, such two-position switch may be used in pairs or singularly used.

What is claimed is:

1. A reproducing/recording apparatus comprising:
   an apparatus body having a disk gate for inserting and ejecting a disk;
   a case provided inside the apparatus body for accommodating the disk;
   a recording/reproducing mechanism for recording on and reproducing from the disk accommodated in the case; and
   a loading mechanism for advancing and retracting the case between a position where the disk faces the recording/reproducing mechanism and a position near the disk gate, the loading mechanism including a motor, a gear mechanism coupled with the motor, and a rack coupled with the gear mechanism and provided along an advancement and retraction direction of the case,
   wherein a groove is formed on at least one of the rack and the case for allowing a relative movement of the rack and the case along the advancement and retraction direction, and
   wherein a start mechanism is formed between the case and the gear mechanism for starting rotation of the motor when the case advances to a predetermined position.

2. The reproducing/recording apparatus according to claim 1, wherein the case includes a hold assembly on which an arm for holding an outer circumferential edge of the disk is provided and a base plate on which the hold assembly is provided.

3. The reproducing/recording apparatus according to claim 2, further comprising an arm lock mechanism that locks the arm when the arm holds the disk.

4. The reproducing/recording apparatus according to claim 3, further comprising an arm unlock mechanism that releases the lock of the arm lock mechanism.

5. The reproducing/recording apparatus according to claim 2, wherein the base plate has a clamper for holding the disk and a clamper hold mechanism for moving the clamper toward the disk when the base plate advances to the recording/reproducing mechanism and for moving the clamper away from the disk when the base plate retracts toward the disk gate.

6. The reproducing/recording apparatus according to claim 1, wherein the apparatus body has a shutter for covering the disk gate when the recording/reproduction mechanism is in operation and for opening the disk gate when the recording/reproducing mechanism is not in operation, the shutter being coupled through a coupling mechanism with a switch lever that stops driving the loading mechanism and starts driving the recording/reproducing mechanism.

7. The reproducing/recording apparatus according to claim 2, further comprising:
   a plurality of the arms, one of which being an eject arm for pushing out the disk toward the disk gate; and
   a dumper mechanism for reducing push-out force of the disk pushed out by the eject arm.

8. The reproducing/recording apparatus according to claim 2, further comprising a manual eject mechanism for manually ejecting the hold assembly, the manual eject mechanism having an eject member that ejects the disk by a plurality of pushing operations.

9. The reproducing/recording apparatus according to claim 8, further comprising a disk lock mechanism for locking the disk when the eject member is manually pushed.

10. The reproducing/recording apparatus according to claim 8, wherein the manual eject mechanism includes a one-way clutch that transfers the drive of the eject member only in a direction in which the eject member is manually pushed.

11. The reproducing/recording apparatus according to claim 2, wherein the recording/reproducing mechanism is attached to the apparatus body in a manner that an end thereof is turnably supported while the other end is swingable toward and away form the disk accommodated in the hold assembly.

* * * * *